US012786702B2

(12) United States Patent
Luo

(10) Patent No.: US 12,786,702 B2
(45) Date of Patent: Nov. 3, 2026

(54) METHODS, DEVICES AND SYSTEMS FOR ADDING DEVICES TO A WIRELESS NETWORK

(71) Applicant: Cypress Semiconductor Corporation, San Jose, CA (US)

(72) Inventor: Hui Luo, Marlboro, NJ (US)

(73) Assignee: Cypress Semiconductor Corporation, San Jose, CA (US)

( * ) Notice: Subject to any disclaimer, the term of this patent is extended or adjusted under 35 U.S.C. 154(b) by 324 days.

(21) Appl. No.: 18/532,971

(22) Filed: Dec. 7, 2023

(65) Prior Publication Data

US 2025/0193943 A1 Jun. 12, 2025

(51) Int. Cl.

| | |
|---|---|
| ***H04W 12/043*** | (2021.01) |
| ***H04L 9/08*** | (2006.01) |
| ***H04W 12/03*** | (2021.01) |
| ***H04W 12/0433*** | (2021.01) |
| ***H04W 12/50*** | (2021.01) |
| ***H04W 12/63*** | (2021.01) |
| ***H04W 76/10*** | (2018.01) |
| *H04L 9/40* | (2022.01) |
| *H04W 84/12* | (2009.01) |

(52) U.S. Cl.

CPC ......... *H04W 12/043* (2021.01); *H04L 9/0872* (2013.01); *H04W 12/03* (2021.01); *H04W 12/0433* (2021.01); *H04W 12/50* (2021.01); *H04W 12/63* (2021.01); *H04W 76/10* (2018.02); *H04L 63/062* (2013.01); *H04W 84/12* (2013.01)

(58) Field of Classification Search

CPC ..... H04L 63/06; H04L 63/062; H04L 63/065; H04L 63/0281; H04L 63/18; H04L 9/08; H04L 9/0819; H04L 9/0833; H04L 9/0827; H04L 9/083; H04L 9/0872; H04W 12/03; H04W 12/0433; H04W 12/043; H04W 12/0431; H04W 12/0471; H04W 12/50; H04W 12/55; H04W 12/63; H04W 12/64; H04W 12/088; H04W 76/10; H04W 80/12

See application file for complete search history.

(56) References Cited

U.S. PATENT DOCUMENTS

| | | | | |
|---|---|---|---|---|
| 7,519,181 | B2 * | 4/2009 | Shaheen | H04L 63/0492 380/258 |
| 12,317,342 | B2 * | 5/2025 | Prakash | H04L 9/0838 |
| 2015/0245204 | A1 * | 8/2015 | Heydon | H04L 43/10 713/171 |
| 2019/0261168 | A1 * | 8/2019 | Shi | H04W 12/35 |
| 2020/0120087 | A1 * | 4/2020 | Sreenivas | H04L 63/0492 |
| 2021/0051069 | A1 * | 2/2021 | Stammers | H04L 67/12 |
| 2021/0266302 | A1 * | 8/2021 | Daly | G06F 21/44 |

* cited by examiner

*Primary Examiner* — Shaqueal D Wade-Wright

(57) ABSTRACT

A method can include, by operation of a first wireless device, in response to detecting a user input at the first wireless device, transmitting a first wireless message. In response to receiving a second wireless message, a determination can be made that an intermediate device is within a predetermined proximity. A sharing message can be received that includes a secret value. In response to receiving an exchange message, a determination can be made that a second wireless device stores the secret value. An operation can be executed to add the first or second wireless device to a wireless network that includes transmission of provisioning messages having the address corresponding to the second wireless device. Corresponding devices and systems are disclosed.

20 Claims, 21 Drawing Sheets

| Category | Action | Organization ID | Version | Other | Frame Type |
|---|---|---|---|---|---|
| Public Action 540-0 | Vendor Spec. 540-1 | 540-2 | 540-3 | | In Range ACK or NACK 540-4 |

Wi-Fi BP Range ACK or NACK 528-04/06

| Category | Action | Organization ID | Version | Other | Frame Type | Attributes |
|---|---|---|---|---|---|---|
| Public Action 542-0 | Vendor Spec. 542-1 | 542-2 | 542-3 | | DPP Secret 542-4 | Shared Secret Value 542-5 |

Wi-Fi BP Secret Frame 512-0

METHODS, DEVICES AND SYSTEMS FOR ADDING DEVICES TO A WIRELESS NETWORK

TECHNICAL FIELD

The present disclosure relates generally to wireless systems, and more particular to methods by which a wireless device can be added to a wireless network.

BACKGROUND

The addition of network connectivity to consumer and industrial devices, including the growing Internet of Thing (IoT) devices, has resulted in the need to frequently add new devices to wireless networks. Typically, manufacturers include instructions that can enable a user to manually configure a device for a network (i.e., wireless device provisioning). However, there is no uniformity in such applications, which can inconvenience a user.

One conventional way of automatically adding a device to a network is the conventional Push Button Configuration (PBC) method. The conventional PBC method involves a user pushing a button on an access point device (AP) and pushing a button on the to-be-added device within a limited time period (e.g., two minutes). A drawback to the conventional PBC methods is that such methods can be vulnerable to passive attacks as well as impersonation attacks.

In an attempt to make PBC operations more secure, a new PBC method has been proposed as part of the Wi-Fi Easy Connect Specification promulgated by the Wi-Fi Alliance. The new PBC method uses a proof of knowledge of a shared code, key phrase or word (PKEX), which can defeat a passive attack. However, such a method can be susceptible to an impersonation attack in some circumstances.

Other conventional provisioning processes are known, such as the Matter Commission Protocol defined by the Connectivity Standards Alliance, as well as bootstrapping methods that utilize QR codes. However, such other provisioning methods can require strong authentication steps based on a shared passcode known to both devices, or security certificates derived from a Certificate Authority (CA). Shared passcodes can be difficult to implement among different manufacturers. CA based approaches can result in greater device cost.

It would be desirable to arrive at an easier way to securely provision devices to a wireless network.

SUMMARY

Embodiments can include methods, devices and systems that include, by operation of a first wireless device, in response to detecting a user input at the first wireless device, transmitting a first wireless message. In response to receiving a second wireless message, a determination can be made that an intermediate device is within a predetermined proximity. A sharing message can be received that includes a secret value. In response to receiving an exchange message, a determination can be made that a second wireless device stores the same secret value. An operation can be executed to add the first or second wireless device to a wireless network that includes transmission of provisioning messages having the address corresponding to the second wireless device.

DETAILED DESCRIPTION

According to embodiments, a wireless device can be added to a network by using a trusted intermediate device. An input on a wireless device controlling the network, such as an access point (AP), can be activated. An input on a wireless device to be added, such as a station device (STA), can be activated. If an intermediate device is determined to be within close proximity to the wireless devices, a secret value can be accepted by both devices from the intermediate device. The two wireless devices can then proceed to execute a provisioning operation using shared secret value.

In some embodiments, a wireless device can be activated by pushing a button on the device.

In some embodiments, an intermediate device can be determined to be in range according to the protocol or method used to communicate with the wireless devices. In some embodiments, such a protocol or method can be a near field communication (NFC) protocol.

In some embodiments, an intermediate device can be determined to be in range by executing wireless ranging operations with the wireless devices. In some embodiments, secure wireless ranging can be used. In such secure wireless ranging, a wireless device can send values that enable an intermediate device to validate a wireless device, and establish master encryption values for secure wireless ranging.

In some embodiments, an intermediate device can send a secret value to both wireless devices. Such a secret value can be used by the devices in a "proof of knowledge of a shared code, key phrase or word" (PKEX) operation, which can be used to bootstrap into a provisioning operation, such a Device Provisioning Protocol (DPP).

In some embodiments, in response to having an input activated, a wireless device can transmit a notice data frame over predetermined channels for detection by an intermediate device. A notice data frame can include a public key for use by an intermediate device for encrypting values transmitted back to the wireless device.

Figure 1:
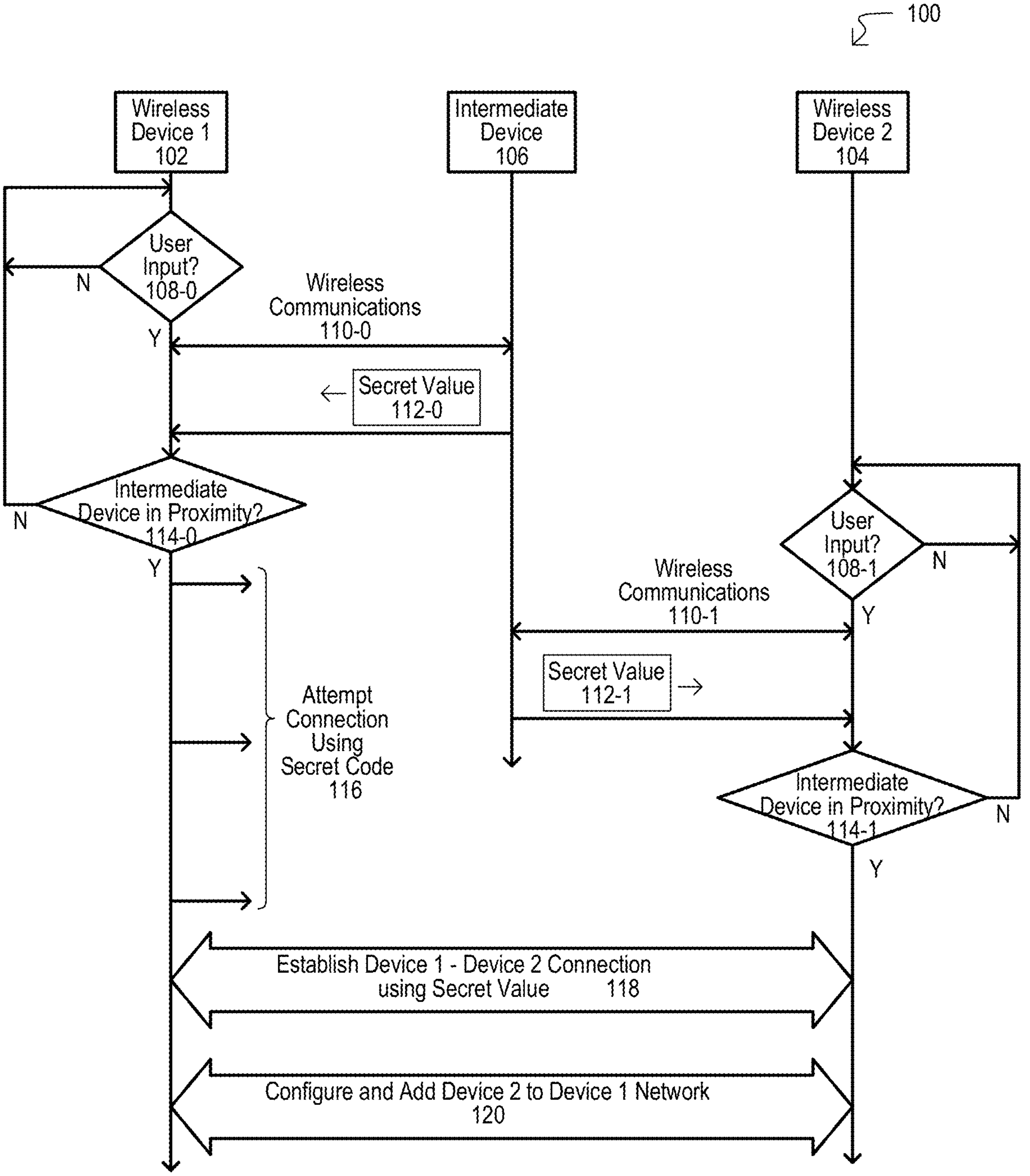
FIG. 1 is a signaling diagram showing a system and corresponding operations according to an embodiment.

FIG. 1 is a signaling diagram of a system 100 and operations according to an embodiment. A system 100 can include a first wireless device 102, a second wireless device 104, and an intermediate device 106. It is assumed that wireless first wireless device 102 is part of a wireless network and has the capability of adding other devices to its wireless network. Second wireless device 104 is a device that is to be added to the wireless network. An intermediate device 106 can be capable of communicating wirelessly with first and second devices 102/104, and is a "trusted" device. That is, the security of intermediate device has been established for a user who is adding the second device 104 to the wireless network. A user device 106 can take any suitable form, and in some embodiments can be a personal electronic device of a user, such as a smart phone, as but one of many possible examples.

First and second wireless devices 102/104 have user inputs to enable easy network configuration. Such user inputs can be activated when a user is close to the wireless device, and take any suitable form, such as button or equivalent structure.

A first wireless device 102 can monitor for a user input 108-0. If a user input is detected (Y from 108-0), wireless communications can occur between the first wireless device and intermediate device 110-0. Such communication can take any suitable form, including the transmission and receipt of one or more data frames. An intermediate device 106 can transmit a secret value 112-0 to first wireless device 108-0. A secret value can be a value generated by an intermediate device that can be unique to a configuration operation, such as a random number and/or a nonce.

From wireless communications 110-0 with intermediate device 106, a first wireless device 102 can determine if the intermediate device is within a certain proximity to the first wireless device 102. If the intermediate device is determined to not be within a certain proximity (N from 114-0), a first wireless device 102 can cease attempts to provision a new device.

If the intermediate device is determined to be within the predetermined proximity (Y from 114-0), a first wireless device 102 can attempt to connect to the second wireless device 116. It is noted that, wireless communications 110-0 between first wireless device 102 and intermediate device 106 can be different from, or the same as, that used to attempt a connection 116. Determining if the intermediate device is within the proximity 114-0 can include any suitable methods, including but not limited to using a relatively short range protocol in wireless communications 110-0, such as an NFC standard and/or wireless ranging.

A second wireless device 104 can undergo similar operations as a first wireless device 102, including detecting a user input 108-1, having wireless communications 110-1 with an intermediate device 106, receiving the same secret value as the first wireless device 112-1, and determining if the intermediate device is within a proximity to the second wireless device 114-1. If a second wireless device has determined the intermediate device is within the proximity, it can attempt to establish a connection with first wireless device 116.

Establishing a connection 116 can include establishing a connection using the same (i.e., shared) secret value. Because such a secret value can be received from an intermediate device within proximity, the secret value can be trusted. Once a secure connection is established, a second wireless device 104 can be configured and added to a wireless network using communications with the first wireless device 120.

It is understood that while FIG. 1 shows communications between the first wireless device 102 and the intermediate device 106 preceding those with the second wireless device 104, such an order of operations can be the opposite and/or partially or essentially simultaneous.

In this way, an intermediate device determined to be in proximity to wireless devices can provide a shared secret value to such wireless devices. The wireless devices can then use the shared secret value to establish a connection to configure and add a wireless device to a wireless network.

Figure 2A:
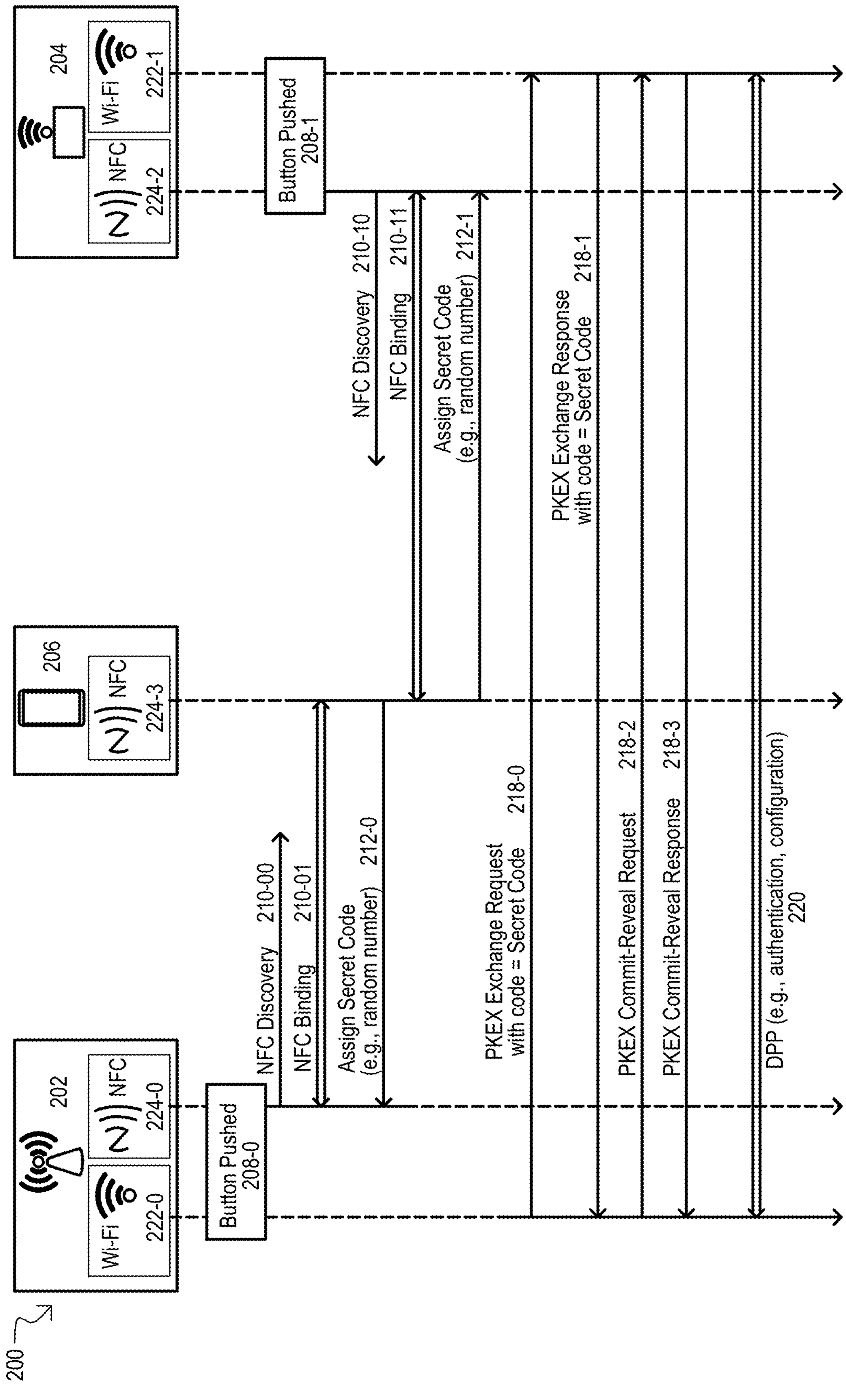
FIG. 2A is a signaling diagram showing a system having devices with near field communication (NFC) circuits and corresponding operations according to an embodiment.

FIG. 2A is a diagram of a system 200 and operations according to another embodiments. A system 200 can utilize an NFC standard to ensure that an intermediate device is within close range when it provides a shared secret code. A system 200 can include a first wireless device 202, second wireless device 204 and an intermediate device 206. First and second wireless devices 202/204 can each include wireless circuits compatible with one or more IEEE 802.11 wireless standards (referred to herein as Wi-Fi) 222-0/1 as well as circuits compatible with one or more NFC standards 224-0/1. Intermediate device 206 can include NFC circuits 224-3.

In response to a button being pushed 208-0 on a first wireless device 202, a first wireless device can start NFC discovery operations 210-00. Such operations can include using NFC circuits 224-0 to transmit wireless signals according to an NFC standard that can enable devices within close proximity (i.e., intermediate device 206), to discover the first wireless device 202. A first wireless device 202 and intermediate device 206 can establish a connection (NFC binding 210-01) to enable the transmission of data from intermediate device to first wireless device 202. An intermediate device 206 can assign a secret code to the first wireless device 212-0. In some embodiments, a such secret code can be a random number generated by an intermediate device 206.

A second wireless device 204 can undergo similar operations as a first wireless device 202, including detecting a button push 208-1, NFC discovery 210-10, NFC binding 210-11, and being assigned a secret code 212-1.

Once both first and second wireless devices 202/204 have the shared secret code, using Wi-Fi circuits, one of the wireless devices (in the example shown, the first wireless device 202) can start a PKEX operation using the shared secret code. In the embodiment shown, such an operation can include, but is not limited to, sending a PKEX exchange request 218-0 with the shared secret code as the code. The other device (e.g., the second wireless device 204) can return a PKEX exchange response 218-1 with the secret code as the code, which can have the source address of the second wireless device 204. This can be followed by a PKEX commit-reveal request 218-2 and PKEX commit-reveal response 218-3.

First and second devices 202/204 can enter an authentication and configuration protocol to add one wireless device (e.g., the second wireless device 204) to a network using the other wireless device (e.g., the first wireless device 202). In the embodiment shown, such a protocol can be a DPP 220 promulgated by the Wi-Fi Alliance. However, any suitable provisioning method can be used, including proprietary methods.

Figure 2B:
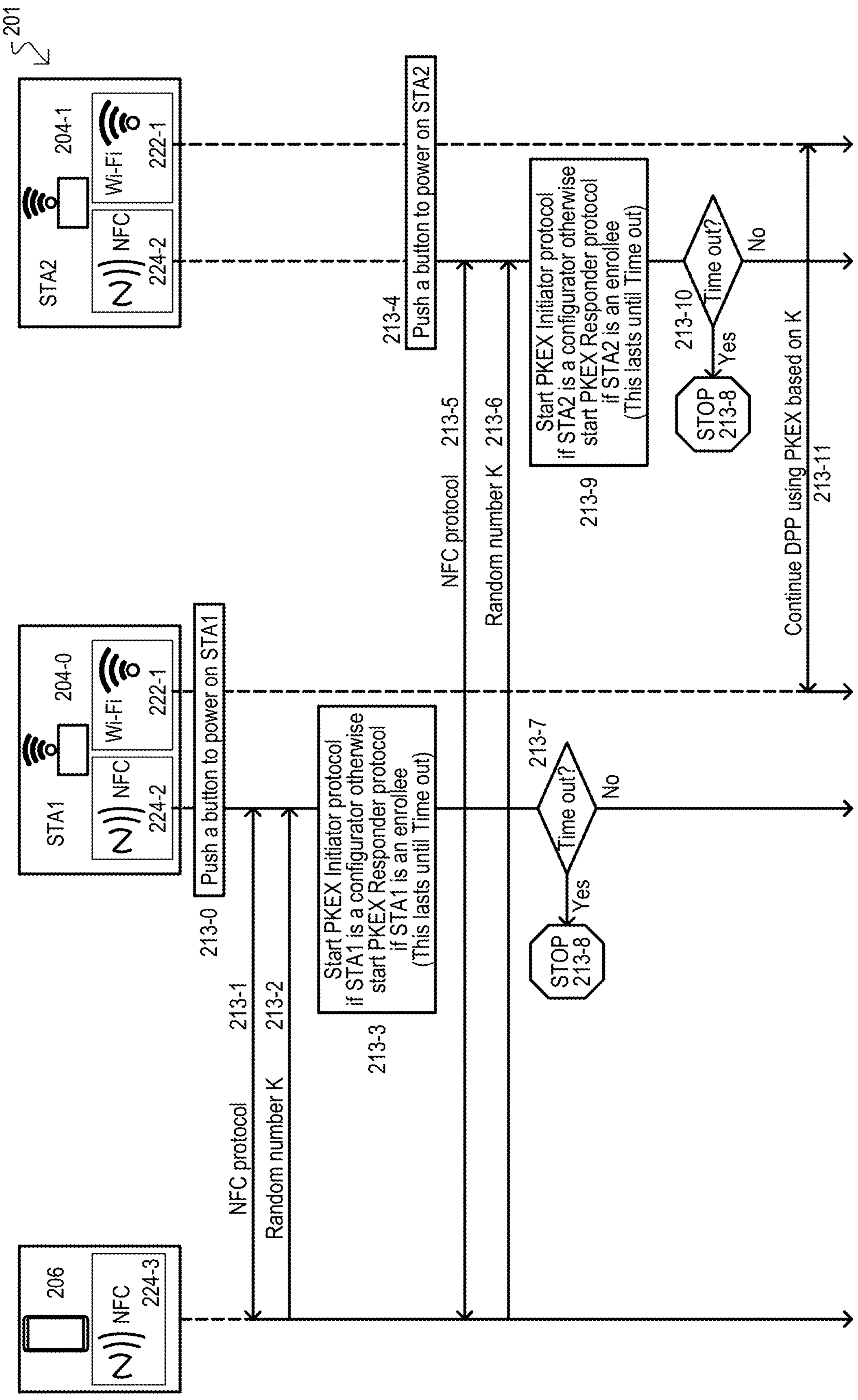
FIG. 2B is a signaling diagram showing a system having devices with NFC circuits and corresponding operations according to another embodiment.

FIG. 2B is a signaling diagram of a system 201 according to another embodiments. A system 201 can include devices like those shown in FIG. 2A, and such like devices are shown with the same reference characters. A first and second wireless devices 204-0/1 can be Wi-Fi station devices (STA1 and STA2). As in the case of FIG. 2A, a system can enable the provisioning of a device using an NFC protocol to ensure the trustworthiness of an intermediate device.

In response to a button (or other user input) being activated on STA1 204-0, an NFC protocol 213-1 can be initiated between STA1 204-0 and an intermediate device 206. NFC protocol 213-1 can ensure that intermediate device 206 can trust STA1 204-0. Using NFC protocol 213-1, intermediate device 206 can provide a random number K to STA1 213-2. STA1 can then start and maintain a PKEX protocol until a time out period 213-3. If STA1 204-0 is a configurator in the provisioning process, it can execute the PKEX protocol as an initiator. Conversely, if STA1 204-0 is an enrollee in the provisioning process, it can execute the PKEX protocol as a responder.

In response to a button (or other user input) being activated on STA2 the same or similar operations can occur as for STA1. An NFC protocol 213-1 can be initiated 213-5 and a same random number generated and received at STA2 213-6. STA2 can then start and maintain a role based PKEX protocol until a time out period 213-9. If a time out period is exceeded for either STA1 or STA2 (Yes from 213-7 or 213-10), provisioning operations can end 213-8. If a time out period is not exceeded for both STA1 and STA2 (No from 213-7 and 213-10), STA1 and STA2 can continue a DPP using PKEX based on a same random number K 213-11.

In this way, an intermediate device can use an NFC protocol to ensure the trustfulness of wireless devices in provisioning operations.

Figure 3A:
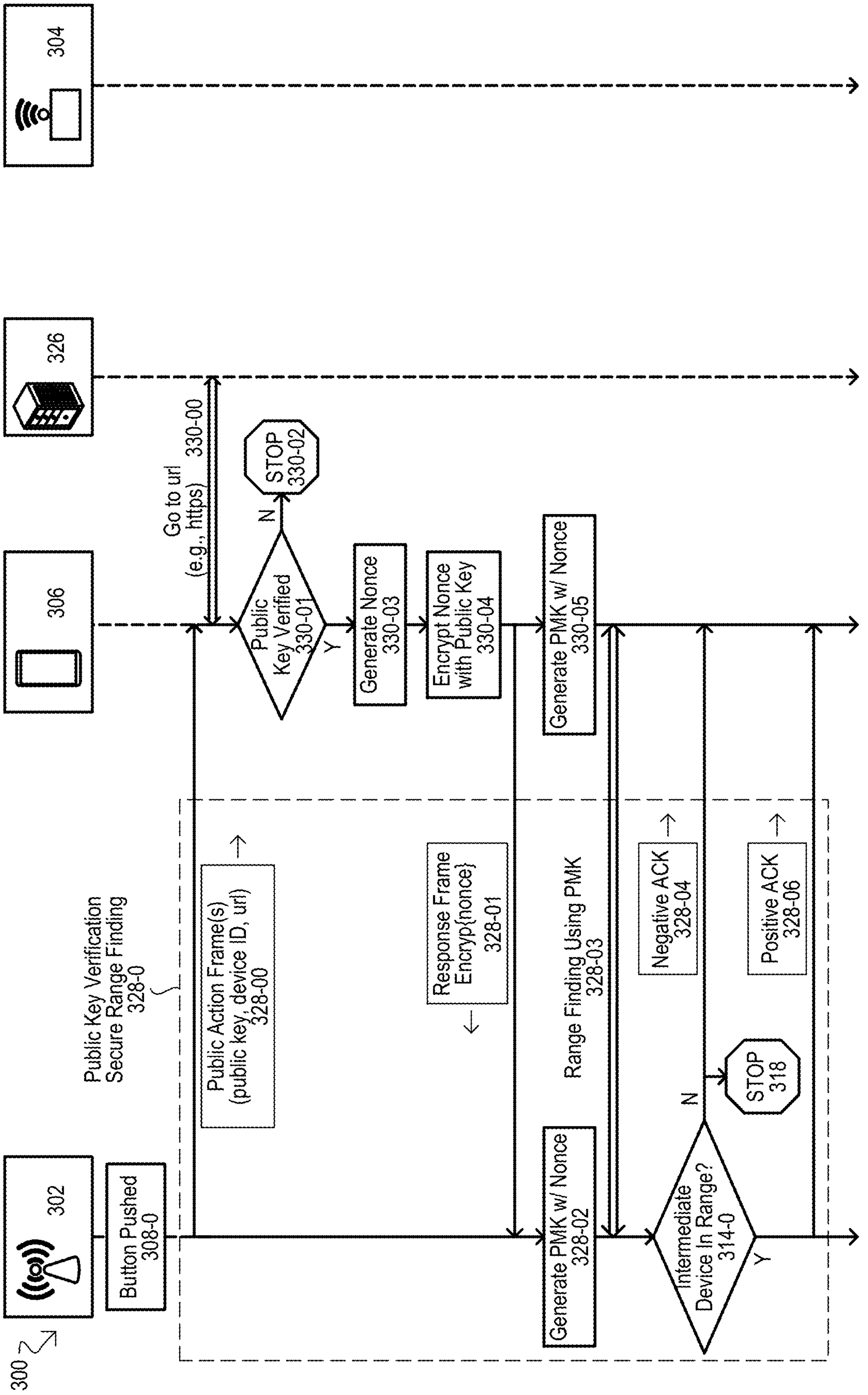
FIGS. 3A to 3C are signaling diagrams showing a system and operations that include wireless ranging according to another embodiment.
Figure 3B:
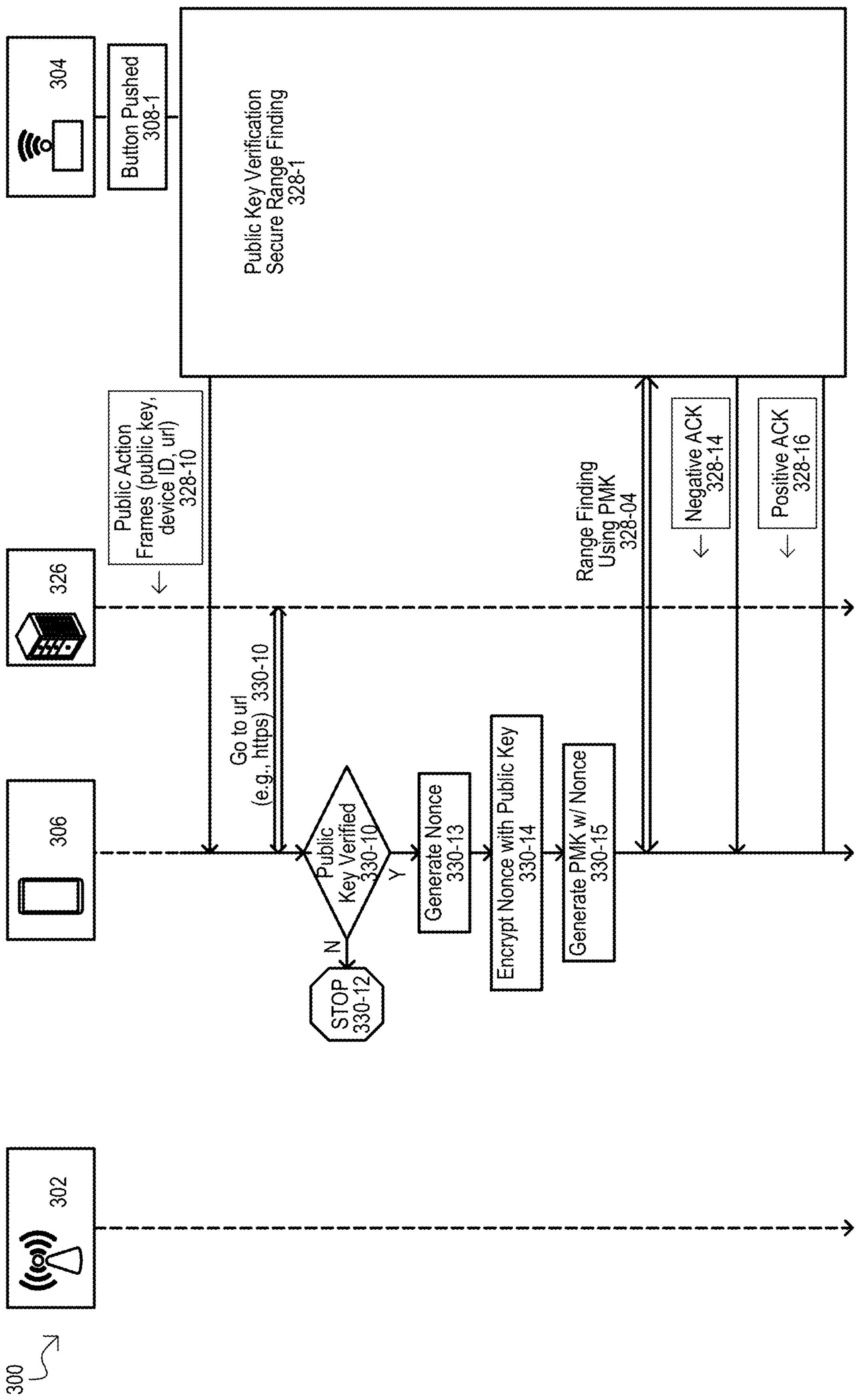
Figure 3C:
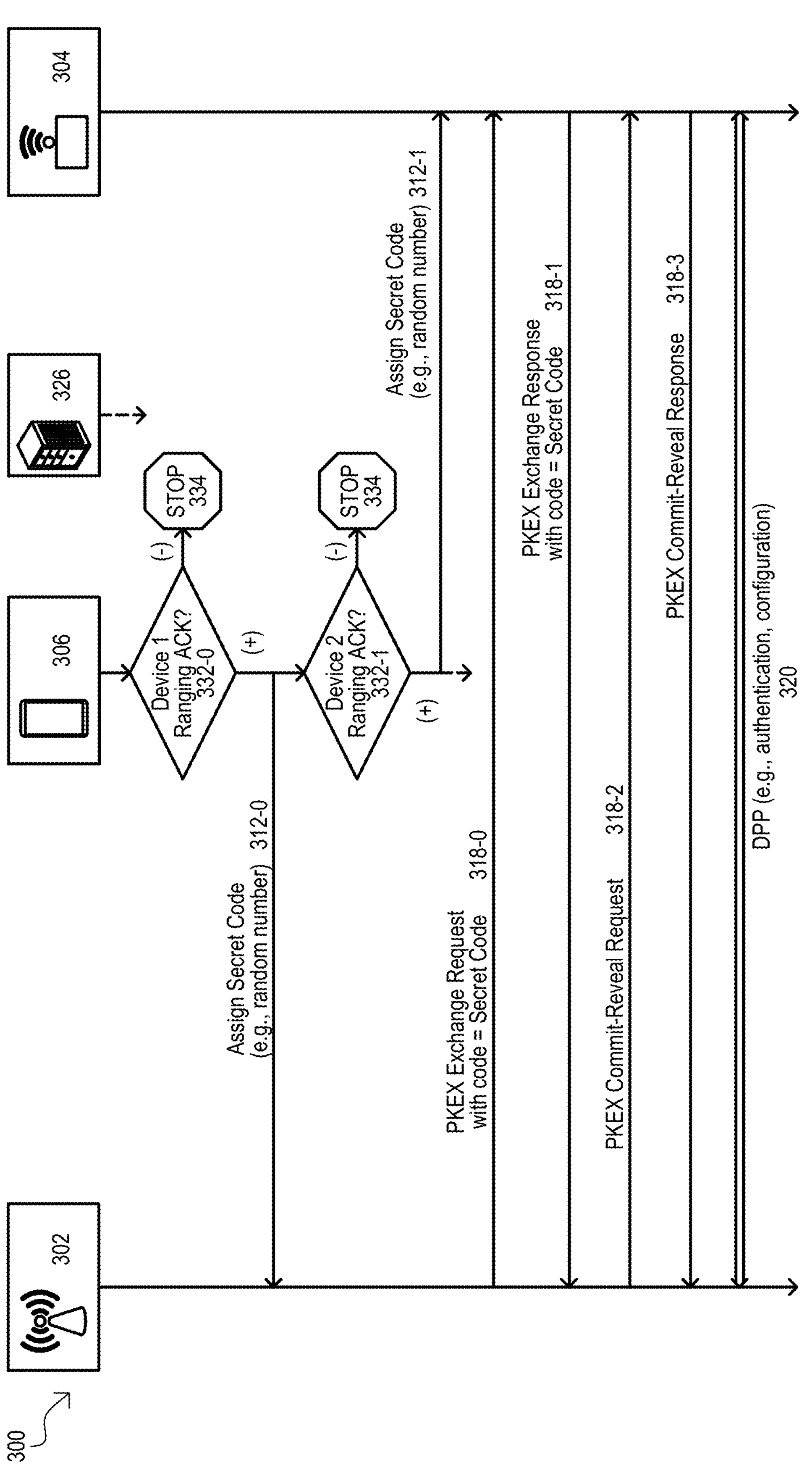

FIGS. 3A to 3C are diagrams showing a system 300 and operations according to another embodiment. A system 300 can include wireless devices that can determine the proximity of a trusted intermediate device with secure, wireless range finding. Unlike the embodiment of FIG. 2, which shows communications according to two different standards (e.g., NFC and Wi-Fi), system 300 can include operations according to one standard (e.g., Wi-Fi). A system 300 can include a first wireless device 302, second wireless device 304, and an intermediate device 306 that can communicate with a server system 326.

In response to a button being pushed 308-0 (or some other user input at the first wireless device 302), a first wireless device 302 can communicate with intermediate device 306 to execute a public key verification and secure ranging operation 328-0. A first wireless device 302 can transmit a data frame 328-00 that includes information associated with the first wireless device 302, including a "button push" public key (BP PK), device identification data, and a url. Such a data frame 328-00 can be a public action frame. Such an action can include transmitting a data frame 328-00 repeatedly on one or more predetermined channels. In some embodiments, a data frame can have a broadcast and/or multi-cast address.

An intermediate device 306 can monitor one or more predetermined channels, and in response to receiving a data frame 328-00, determine the included url. An intermediate device 306 can then access a server system 326 using the url 330-00. In some embodiments, such an access can include an https connection with a server system 326. Using device information included in the received data frame 328-00, through communication with server system 326, intermediate device 326 can verify the BP PK 330-01 for the first wireless device. If the BP PK cannot be verified (N from 330-01), a configuration operation can end 330-02.

If a BP PK can be verified (Y from 330-01), an intermediate device 306 can generate a value 330-03 for ensuring secure communications with first wireless device 302. In the embodiment shown, such a value can be a nonce. Intermediate device 306 can encrypt the generated value with the BP PK 330-04. The encrypted value can be transmitted to first wireless device 302 in a response frame 328-01. In some embodiments, such a response frame can be addressed to a first wireless device 302.

Public key verification and secure range finding 328-0 can continue for first wireless device upon receiving response frame 328-01. First wireless device 302 can decrypt received values to determine the value (e.g., nonce) received from an intermediate device 306. Such decryption can use a private key corresponding to the BP PK. Using the decrypted value, first wireless device 302 can generate a pair wise master key (PMK) 328-02 for encrypting and decrypting communications with intermediate device 306. Intermediate device 306 can generate the same PMK 330-05.

A first wireless device 302 can then execute a wireless range finding operation using the PMK 328-03. Such range finding can include any suitable method, including but not limited to fine time measurement (FTM). Upon completing a wireless ranging operation, first wireless device 302 can determine if an intermediate device is within range (e.g., close enough to be trusted in the environment/circumstances) 314-0. If the intermediate device is determined to not be in range (N from 314-0), a first wireless device can transmit a negative acknowledgement (NACK) to intermediate device 306, and configuration operations can end 318. If the intermediate device is determined to be in range (Y from 314-0), a first wireless device can transmit a positive acknowledgement (ACK) to intermediate device 306, and configuration operations can continue.

Referring to FIG. 3B, a same or similar public key verification and range finding operation 328-1 can occur between second wireless device 304 and intermediate device 306. This can include intermediate device 306 receiving a frame with a BP PK, device information and url 328-10. Intermediate device 328-10 can to a url for the second wireless device 330-10 and verify the BP PK 330-10. If the BP PK is verified, the intermediate device 306 can generate a new value (e.g., different nonce) 330-10, encrypt it with the validated BP PK, and generate a PMK 330-15. A second wireless device 304 can execute wireless ranging with intermediate device 328-04. Second wireless device 304 can then issue a NACK 328-14 or ACK 328-16 according to a ranging result.

It is understood that public key verification and secure ranging 328-0/1 between intermediate device 306 and wireless devices 302/304 need not be sequential. An intermediate device 306 can be executing such operations with both devices 302/304 in a same time period.

Referring to FIG. 3C, an intermediate device 306 can determine the type of ACK was received from a first wireless device 332-0. If a negative ACK was received (– from 332-0), an operation can end 334. If a positive ACK was received (+ from 332-0), an intermediate device can assign secret code 312-0 to the first wireless device 302. In some embodiments, a secret code can be a random number. An intermediate device 306 can also determine the type of ACK received from a second wireless device 332-1. If a negative ACK was received (– from 332-1), an operation can end 334. If a positive ACK was received (+ from 332-1), an intermediate device can assign the secret code 312-1 to the second wireless device 304. Operations can then proceed as described for FIG. 2. Between first and second wireless devices, PK EX exchange request/response with the secret code 318-0/1 can occur. PK EX commit-reveal request/response with the secret code 318-2/3 can occur. A DPP 320 can be used to authenticate and configure the devices.

Figure 3D:
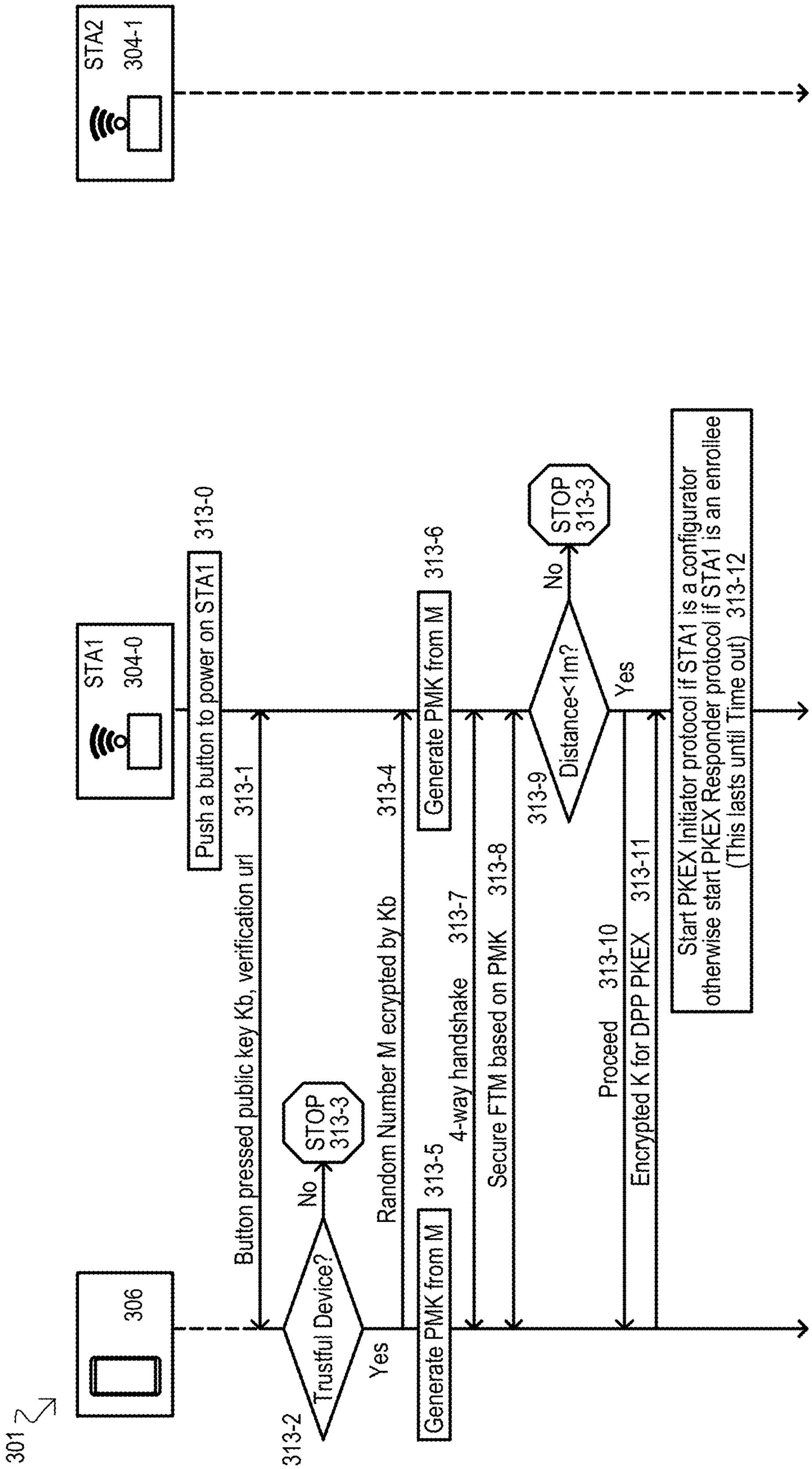
FIGS. 3D and 3E are signaling diagrams showing a system and operations that include wireless ranging according to a further embodiment.
Figure 3E:
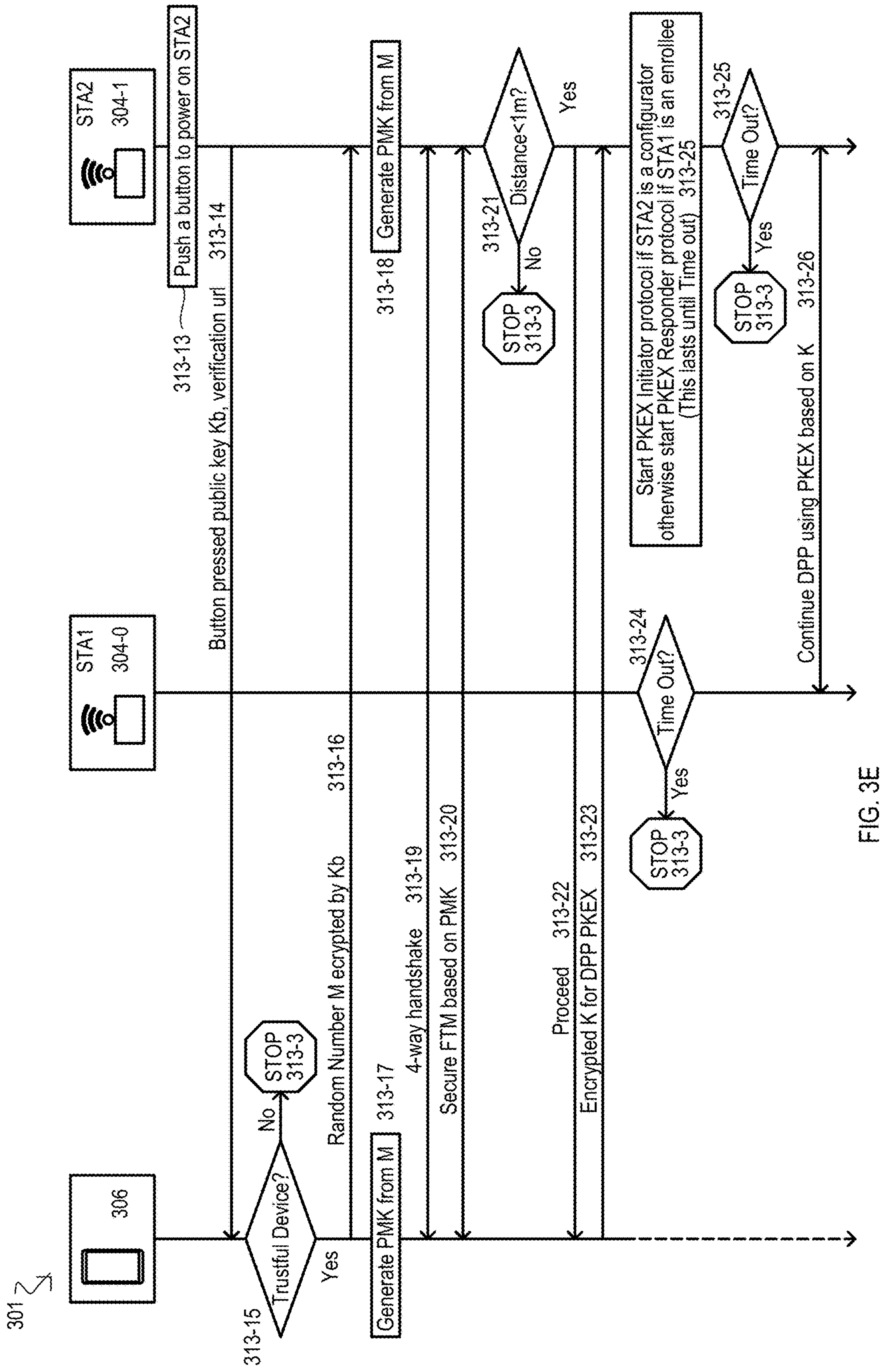

FIGS. 3D and 3E are signaling diagrams showing a system 301 according to another embodiment. A system 301 can include devices like those of FIGS. 3A to 3C, and such like devices are referred to by the same reference characters. Wireless devices 304-0 and 304-1 can be Wi-Fi STAs.

Referring to FIG. 3D, provisioning operations in a system 301 can begin with a button (or other use input) being activated on STA1 313-0. In response, STA1 304-0 can transmit a public key Kb and url to an intermediate device 313-1. An intermediate device can determine if STA1 is a trustful device 313-2. Such an action can include intermediate device visiting the url, as described herein, or an equivalent. If STA1 is determined to not be trustful (No from 313-3), a provisioning operation can end 313-3.

If STA1 is determined to be trustful (Yes from 313-3), intermediate can generate a random number M, encrypt it with the key Kb, and transmit it to STA1 313-4. Using a corresponding private key, STA1 304-0 can decrypt to arrive at M. Intermediate device and STA1 can generate a PMK from M 313-5 and 313-6. Using the PMK, intermediate device and STA1 can execute a 4-way handshake operation to arrive at encryption keys 313-7. Secure FTM ranging can be executed 313-8 between intermediate device and STA1 304-0. Such ranging can use encryption values (e.g., PMK, PTK) derived in four way handshake 313-7. If STA1 determines intermediate device is not within a predetermined distance (No from 313-9), a provisioning operation can end 313-3. In the embodiment shown, a predetermined distance can be one meter.

If STA1 determines that an intermediate device is within a predetermined distance (Yes from 313-9), STA1 can indicate provision operations can proceed 313-7. Intermediate device 306 can provided an encrypted key (K) for DPP PKEX operations 313-11. A STA1 device can start a PKEX protocol as an initiator or responder according to its provisioning role (i.e., configurator or enrollee) 313-12. Such a PKEX protocol can continue until a time out period is exceeded.

Referring to FIG. 3E, a system can execute the same essential operations between intermediate device 306 and STA2 304-1, as shown for STA1 in FIG. 3D. In response to a button (or other input) activation 313-13, a public key (Kb) and verification url can be provided 313-14. If STA2 is determined to be trustful (Yes from 313-15), a random number (M) encrypted with Kb can be provided to STA2 313-16. Intermediate device and STA2 can generate matching PMKs from M (313-17, 313-17), and then execute a 4-way handshake operation 313-19, and secure FTM based on the PMK 313-20. If a distance between the devices is within a predetermined limit (Yes from 313-21), STA2 can indicate provisioning can proceed 313-22. Intermediate device and provide an encrypted key (K) for DPP PKEX operations 313-23. A STA2 device can start a PKEX protocol based on its role 313-25.

If a PKEX protocol executed by STA1 or STA2 times out (Yes from 313-24 or 313-25), a provisioning operation can end 313-3. If a PKEX protocol executed by both STA1 and STA2 does not time out (No from 313-24 and 313-25), a DPP using PKEX can be executed that is based on the key (K) 313-26.

In this way, a system can include wireless devices can that execute wireless ranging with an intermediate device to establish the trustworthiness of the intermediate device. The wireless devices can receive a secret value from the intermediate device and establish a connection using the secret value.

Figure 4A:
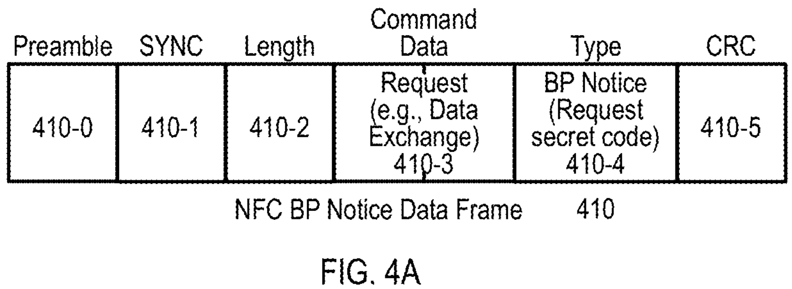
FIGS. 4A and 4B are diagrams showing NFC data frames according to embodiments.
Figure 4B:
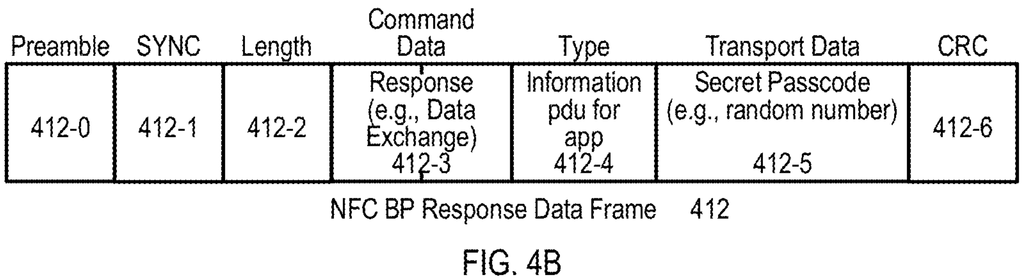

FIGS. 4A and 4B are diagrams of data frames 410 and 412 that can be included in embodiments. Data frames 410 can be transmitted by a wireless device and/or intermediate device, and can be compatible with an NFC standard. Referring to FIG. 4A, a data frame 410 can be a notice frame that indicates to an intermediate device that an input has been activated on a wireless device with NFC capabilities. In the embodiment shown, a frame 410 can include a preamble 410-0 and a synchronization field 410-1. A length value 410-2 can indicate the length of the frame 410. Frame 410 can also include a command field 410-2, which can indicate a request for data (or a data exchange), a type field 410-4, which can indicate a type of request (for a secret code). A frame 410 may include error detection and/or correction data 415-5.

Referring to FIG. 4B, a data frame 412 can be a response frame from an intermediate device that provides a secret value to a wireless device that has indicated its input (e.g., button) has been activated. A data frame 412 can include fields like those of FIG. 4A, including a preamble 412-0, a synchronization field 412-1 and length data 412-2. In the embodiment shown, command data 412-3 can indicate a response from an intermediate device (e.g., data exchange), a type field 412-4 can indicate information for an application. Unlike FIG. 4A, data frame 412 can include transport data which can include a secret value (e.g., secret passcode) 412-5. As understood from embodiments herein, such a secret value can be transmitted to wireless devices to enable secure connections between such wireless devices. A data frame 412 can also include error detection or correction data 412-6.

It is understood that the data frames of FIGS. 4A and 4B are provided by way of example and should not be construed as limiting. Data frames, packets, or other signaling can vary according to a particular NFC method used. Also, it is understood that embodiments anticipate unencrypted as well as encrypted NFC standards for establishing proximity between devices and transmitting secret values from an intermediate device to devices involved in a provisioning operation.

In this way, a wireless or intermediate devices can use NFC messages to indicate its presence, and an intermediate device can use NFC messages to transmit secret codes to intermediate devices.

Figure 5A:
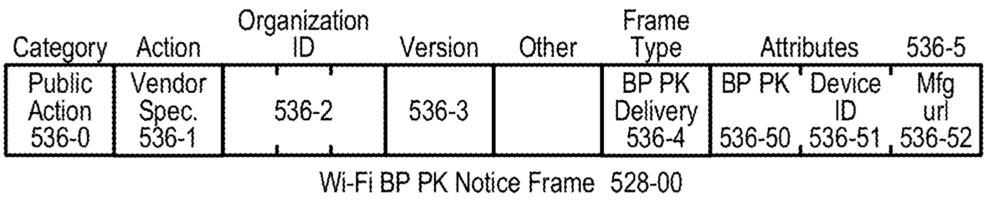
FIG. 5A to 5D are diagrams showing data frames compatible with an IEEE 802.11 wireless (Wi-Fi) standard according to embodiments.

FIGS. 5A to 5D are diagrams of data frames 528-00, 528-01, 528-04/06 and 512-0 that can be included in embodiments. Data frames (528-00, -01, -04/06 and 512-0) can be compatible with one or more Wi-Fi standards. Referring to FIG. 5A, a data frame 528-00 can be a BP PK notice frame that can let an intermediate device know a button has been pushed on a wireless device. BP PK notice frame 528-00 can include various fields. A category field 536-0 can indicate a public action. An action field 536-1 can include a vendor specific value. An organization ID field 536-2 can identify an organization. A version field 536-3 can identify a version or type of data frame. A frame type field 536-4 can indicate the data frame 528-00 is button push frame, that carries a BP PK (and other information). An attribute field 536-5 can include various values that can enable an intermediate device to establish trust in a wireless device, as well as execute wireless ranging with the wireless device. In FIG. 5A, an attribute field 536-5 can include a BP PK 536-50, device ID 536-51 and manufacturing url 536-52. In some embodiments, a BP PK notice frame 528-00 can be transmitted repeatedly on one or more predetermined channels until a response is received, and can have a broadcast destination address.

Figure 5B:
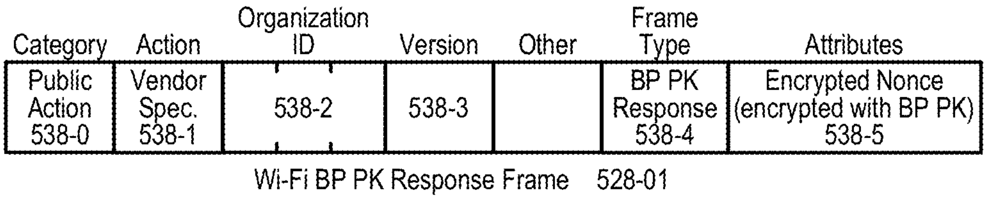

Referring to FIG. 5B, a data frame 528-01 can be a BP PK response frame to a BP PK notice frame. BP PK response frame 528-01 can include various fields like those in FIG. 5A, including a category field 538-0, action field 538-1, organization ID field 538-2 and version field 538-3. A frame type field 538-4 can indicate the data frame 528-01 is button push response frame, that carries a value encrypted with a received BP PK that can be used in a subsequent wireless ranging operation. An attribute field 538-5 can include the value encrypted with the BP PK, which in the embodiment shown can be a nonce generated by the intermediate device encrypted with the BP PK. In some embodiments, a BP PK response frame 528-01 can be transmitted on an agreed upon channel (e.g., determined from the BP PK notice frame), and can have a unicast destination address of the wireless device.

Figures 5C, 5D, 6:
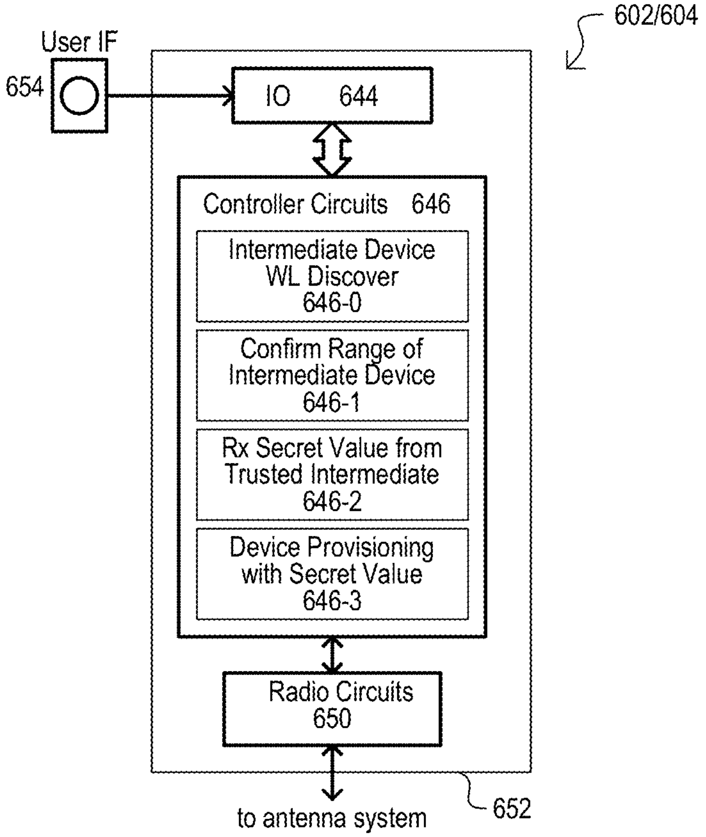
FIG. 6 is a block diagram of a wireless device and system according to an embodiment.

Referring to FIG. 5C, data frames 528-04/06 can be a ranging acknowledgement data frames transmitted by a wireless device notifying that the intermediate device as been determined to be in range (and therefor trusted) or out of range (and therefor not trusted). Ranging acknowledgement frames 528-04/06 can include various fields like those in FIG. 5A, including a category field 540-0, action field 540-1, organization ID field 540-2 and version field 540-3. An attribute field 540-4 can include a positive acknowledgement (ACK) or a negative acknowledgement (NACK) according to a wireless ranging result. In some embodiments, ranging acknowledgement frames 528-04/06 can be transmitted on an agreed upon channel, and can have a unicast destination address of the intermediate device.

Referring to FIG. 5D, a data frame 512-0 can be a BP secret frame from an intermediate device for reception by a wireless device. A BP secret frame 512-0 can deliver a secret value shared with another wireless device to enable two wireless devices to execute a network configuration operation. A BP secret frame 512-0 can include various fields like those in FIG. 5A, including a category field 542-0, action field 542-1, organization ID field 542-2 and version field 542-3. A frame type field 542-4 can indicate the data frame 512-0 includes a secret value for a network configuration operation (e.g., DPP). An attribute field 542-5 can include the shared secret value. In some embodiments, a BP secret frame 512-0 can be transmitted on an agreed upon channel, and can have a unicast destination address of a wireless device.

In this way, wireless devices can transmit data frames with a PK, a network location (url), and device information that can enable an intermediate device to validate wireless device PK. An intermediate device that trusts wireless devices, can transmit a data frame with a single use value used for range finding with the wireless devices. Wireless devices can transmit data frames that positively or negatively acknowledge that the intermediate device is in range. An intermediate device can transmit data frames with a shared secret value to wireless devices, that the wireless devices can use to enable automatic configuration and addition of a device to a wireless network.

FIG. 6 is a block diagram of a wireless device 602 (or 604) according to an embodiment. A wireless device 602 can be a device that controls the addition of devices to a wireless network (e.g., an AP) or can be a device that is to be added to a wireless network. A device 602 can include an input/output (IO) circuit 644, a controller circuit 646 and radio circuits 650. IO circuit 644 can be connected to a user interface (IF) 654, and can detect a user input to the device 602. Such a user input can take any suitable form, as described herein, including but not limited to a button push (including touch inputs), taps with other devices (including an intermediate device), as well as very close wireless proximity detection.

Controller circuit 646 can include any suitable circuits for executing wireless communications for wireless devices as described herein, and equivalents, including but not limited to one or more processors, custom logic circuits, programmable logic circuits, machine learned/learning systems, and corresponding memory circuits both volatile and/or nonvolatile. Controller circuits 646 can include intermediate device wireless discovery operations 646-0. Such operations can include a device 602 transmitting predetermined messages or signals on one or more predetermined channels and/or frequency/frequencies to indicate the presence of the device 602 to an intermediate device and/or receiving predetermined messages or signals on one or more predetermined channels/frequencies to indicate the presence of an intermediate device.

Controller circuits 646 can also include confirming a range of an intermediate device 646-1. Such an operation can include any of those described herein, or equivalents, including but not limited to a limited range standard to contact the intermediate device (e.g., NFC) and/or wireless ranging operations, both secure or unsecured. Controller circuits 646 can further include operations that receive a secret value from a trusted intermediate device 646-2. Such an action can include receiving a secret value from an intermediate device determined to be within some limited, maximum range to the device 602. Controller circuits 646 can also include device provisioning with the secret value received from a trusted intermediate device 646-3. Such an action can include interacting with another device, and confirming the other device is also in possession of the secret value. The two devices can then proceed to add one of the devices to an existing wireless network.

Radio circuits 650 can include circuits compatible with one or more standards, including public and/or private standards. According to embodiments, radio circuits can be compatible with any of: one or more NFC standards, one or more Wi-Fi standards, one or more Bluetooth (BT) standards, one or more IEEE 802.15.4 or related standards.

In some embodiments, IO circuits 644, controller circuits 646 and radio circuits 650 can be part of a same integrated circuit substrate 652.

In this way, a wireless device can include circuits for detecting an intermediate device, and use a secret value from the intermediate device to add a device to a wireless network if the intermediate device is determined to be within range of the wireless device.

Figure 7:
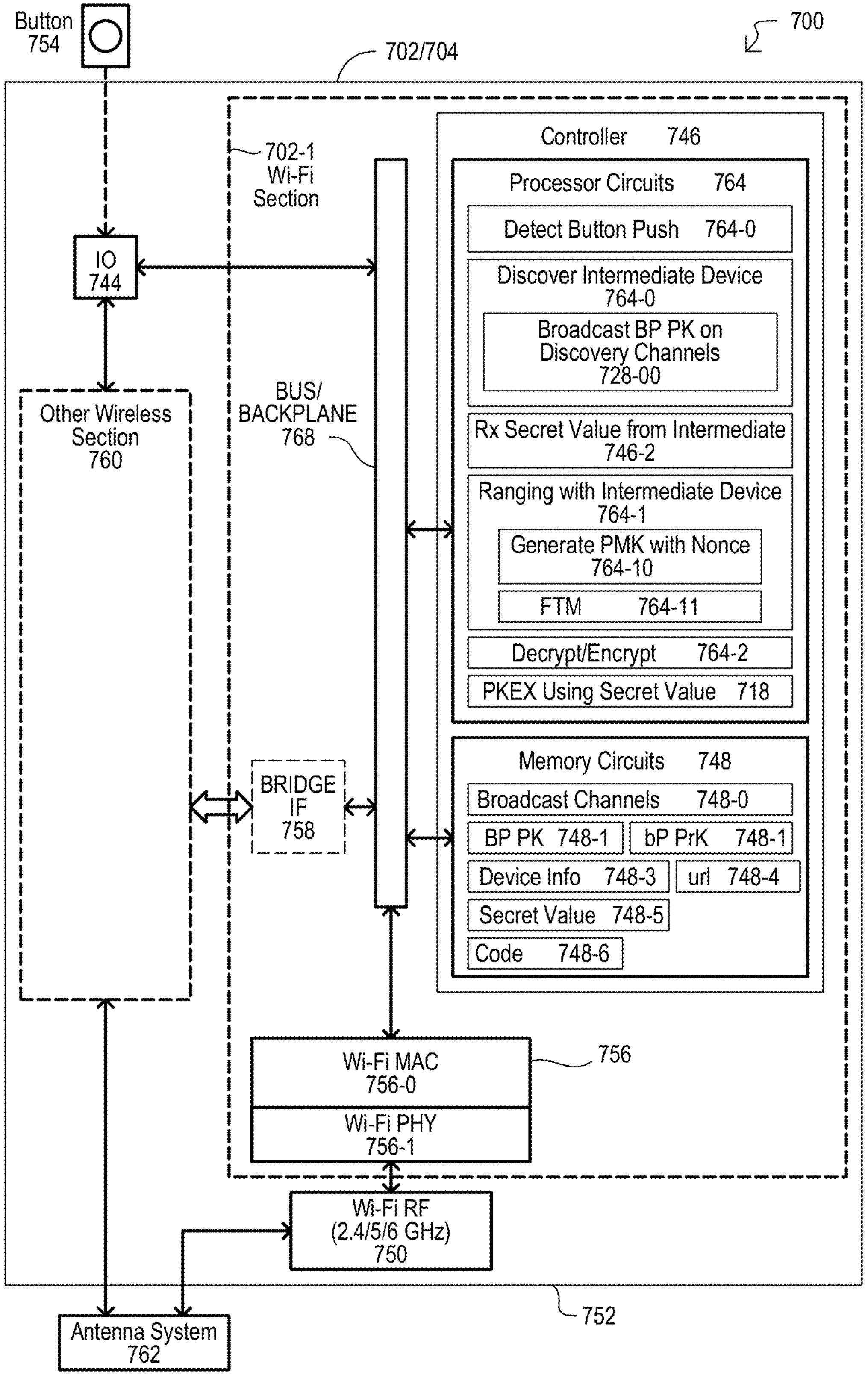
FIG. 7 is a block schematic diagram of a wireless device and system according to another embodiment.

FIG. 7 shows a system 700 according to another embodiment. A system 700 can include a wireless device 702 (or 704), a button 754 and an antenna system 762. A wireless device 702 can includes a Wi-Fi section 702-1, IO circuits 744, and optionally, other wireless circuits 760. Other wireless circuits can be one or more wireless circuits compatible with standard other than a Wi-Fi standard, including but not limited to, one or more BT standards, one or more IEEE 802.15.4 or related standards and/or one or more cellular network standards.

A Wi-Fi section 702-1 can include a controller section 746, Wi-Fi control circuits 756 and optionally, bridge interface circuits 758, in communication with one another over a signaling structure, such as a backplane or bus 768. A controller section 746 can include processor circuits 764 and memory circuits 748. Processor circuits 764 can execute code 748-6 stored in memory circuits 748 to provide various functions for the device 702.

Operations provided by processor circuits 764 an include the following. A detect button push 764-0 can determine when a button 754 is pushed via signals provided at IO circuits 744 to controller section 746. Discover intermediate device 764-0 can include broadcasting a data frame with a BP PK as described herein, or equivalents, including broadcasting such a data frame on one or more predetermined channels. Ranging with intermediate device 764-1 can include executing a wireless ranging operation with an intermediate device. Such operations can include generating a PMK using a nonce provided from an intermediate device. Such a PMK can be used to execute secure ranging using FTM 764-11 with the intermediate device. A secret value can be received from an intermediate device 746-2.

Processor circuits 764 can also perform encryption/decryption operations 764-2 involved in the various actions. Such operations can include, but are not limited to, decrypting received message data with a private key corresponding to a BP PK, as well as encrypting and decrypting ranging messages with a PMK. Upon receiving a secret value from a trusted (e.g., in range) intermediate device, processor circuits 764 can execute PK EX operations using the secret value 718, as described herein or equivalents. PK EX operations can be followed by a DPP operation.

Memory circuits 748 can store data for enabling the various operations of wireless device 702. Memory circuits 748 can include a secure nonvolatile memory, and optionally, volatile memory. In the embodiment shown, data stored by memory circuits 748 can include, but is not limited to, the following. Broadcast channels 748-0 can identify those channels over which device 702 can transmit a data frame with a BP PK, as well as other data (e.g., url, device ID). BP PK 748-1 can be a public key for the device 702 that can be verified by an intermediate device. Such a public key can be the same for multiple devices of the same type. bP PrK 748-2 can be a private key corresponding to BP PK, and can be stored in a secure memory. Device info 748-3 can be information identifying a device 702, which can be transmitted to an intermediate device to assist in a public key verification operation. A secret value 748-4 can be value received from an intermediate device as described herein and equivalents. Code 748-6 can be executed by processor circuits 764 to provide the various operations described (e.g., firmware).

Bridge interface circuits 758 can enable communications between Wi-Fi section 702-1 and other wireless circuits 760.

Wi-Fi control circuits 756 can provide wireless communications compatible with one or more Wi-Fi standards. Wi-Fi control circuits 756 can include MAC layer circuits 756-0 and physical layer (PHY) circuits 756-1. PHY circuits 756-0 can operate with RF circuits 750, which can enable the transmission and reception of communications compatible with one or more Wi-Fi standards, on any suitable band, including but not limited to the 2.4 GHz, 5 GHz and/or 6 GHz bands.

IO circuits 744 can input or output signals that can enable control of a device from sources external to the device, including from button 754. IO circuits 744 can enable communication with the device according to any suitable fashion. In some embodiments, IO circuits 744 can include serial communication circuits, including but not limited to: serial digital interface (SDI), universal serial bus (USB), universal asynchronous receiver transmitter (UART), 12C, or 12S.

A device 702 can operate in conjunction with an antenna system 762 having antennas compatible with one or more Wi-Fi standards, as well as other standards if another wireless section 760 is included.

In some embodiments, Wi-Fi section 702-1, IO circuits 744, and other wireless section 760 if included, can be formed with a same integrated circuit substrate 752.

In this way, a Wi-Fi compatible wireless device can, in response to the push of a button, discover an intermediate device, execute a ranging operation with the intermediate device, and use a secret value from the intermediate device to enter into a configuration with another wireless device.

Figure 8:
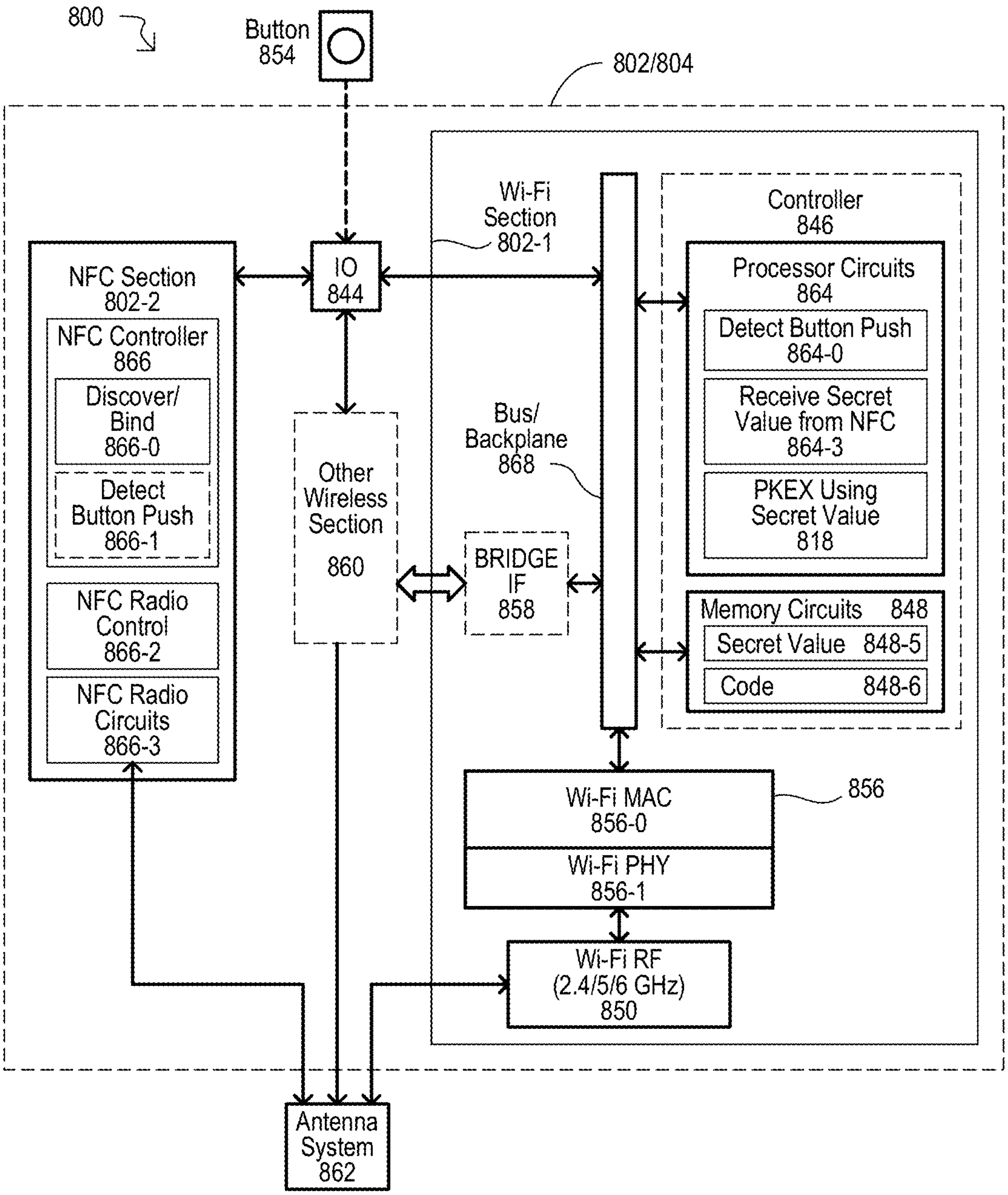
FIG. 8 is a block schematic diagram of a wireless device and system according to a further embodiment.

FIG. 8 shows a system 800 according to another embodiment. A system 800 can include items like those of FIG. 7, and such items are referred to by the same reference character but with the leading digit being an "8" instead of a "7".

A system 800 can differ from that of FIG. 7 in that device 802 can include an NFC section 802-2. An NFC section 802-2 can include an NFC controller 866, NFC radio control circuit 866-2 and NFC radio circuits 866-3. An NFC controller 866 can control operations of NFC section 802-2 to enable operations according to one or more NFC standards. An NFC controller 866 can include NFC discover and binding operations 866-0. Such an operation can include a device 802 transmitting NFC signals to indicate its presence or receive such signals to discover an intermediate device. A binding operation can enable a connection with an intermediate device to enable receipt of a secret value. Optionally, an NFC controller 866 can detect a button push 866-1.

NFC radio control circuits 866-2 can control NFC radio circuits 866-3 to enable the transmission and reception of signals according to one or more NFC standards.

Referring still to FIG. 8, processor circuits 864 of Wi-Fi section 80201 include operations that receive a secret value from NFC section 802-2. Such an action can include, after a secret value has been received from an intermediate device at NFC section 802-2, such a secret value can be transferred from NFC section 802-2 to processor circuits 864.

In this way, a device can communicate with an intermediate device with NFC circuits to receive a secret value. The device can then use Wi-Fi circuits and the secret value to enter into a configuration operation with another wireless device.

Figure 9:
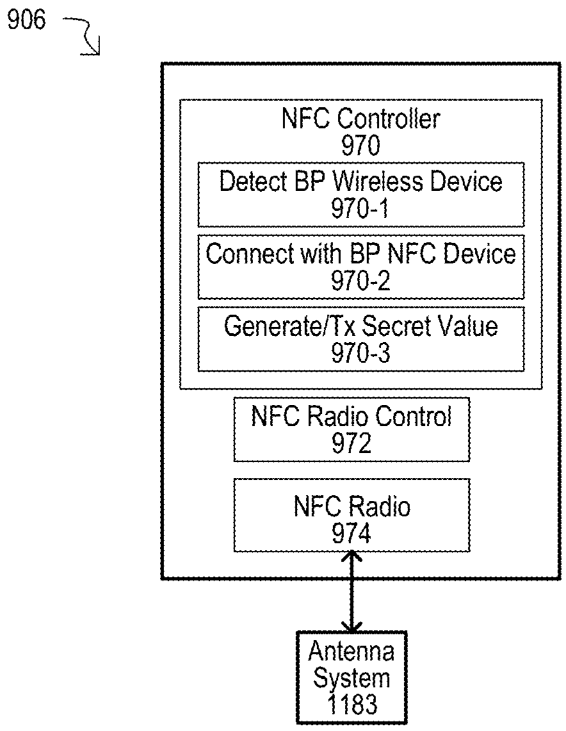
FIG. 9 is a block diagram of an intermediate device according to an embodiment.

FIG. 9 is a block diagram of an intermediate device 906 according to an embodiment. A device 906 can include NFC controller circuits to communicate with nearby wireless devices to thereby establish trust with such wireless devices, and then provide a shared secret value to the wireless devices. Such a shared secret value can be used to start (e.g., bootstrap) a secure provisioning operation that enables a wireless device to be added to a wireless network. An intermediate device can include an NFC controller 970, NFC radio control circuits 972 and NFC radio circuits 974.

In the embodiment shown, an NFC controller 970 can include, but is not limited to, the following operations. A detect a button push on a wireless device 970-0 can include intermediate device 906 receiving a wireless message or other signals from a wireless device that indicates a user input (e.g., button push) has been activated on the wireless device. In some embodiments, an intermediate device 970 can monitor predetermined NFC channels for transmissions from a wireless device, and then respond to such messages. However, in alternate embodiments, an intermediate device 906 may transmit discovery messages on NFC channels, and receive a response message from a wireless device indicating an input has been activated.

Regardless of whether NFC communications are initiated by an intermediate device or wireless device, by operation of controller 970, intermediate device 906 can connect to a wireless device 970-2. Due to the short range of an NFC standard, a trustworthiness of an intermediate device 906 can be established. Accordingly, in some embodiments, NFC communications may not be encrypted, require authentication, or include some other security feature. However, in other embodiments NFC communications between intermediate device 906 and a wireless device can include any or all such security features.

Once a connection is established, an intermediate device 906 can generate and transmit a secret value 970-3 to a wireless device indicating an activated user input. As noted herein, in some embodiments, a secret value can be a random number generated by controller 970. It is also understood that intermediate device can transmit a same secret value to another wireless device.

NFC radio control circuits 972 can provide wireless communications compatible with one or more NFC standards. NFC control circuits 972 control NFC radio 974 to transmit and receive messages according one or more NFC standards.

NFC radio circuits 974 can be connected to an antenna system 1183.

In this way, an intermediate device can include circuits for establishing NFC communications with wireless devices, and then generate and transmit a secret value over such NFC connections. Wireless devices receiving the secret value can use such the secret value to initiate a network configuration operation between the devices (which may not include any more actions from the intermediate device).

Figure 10:
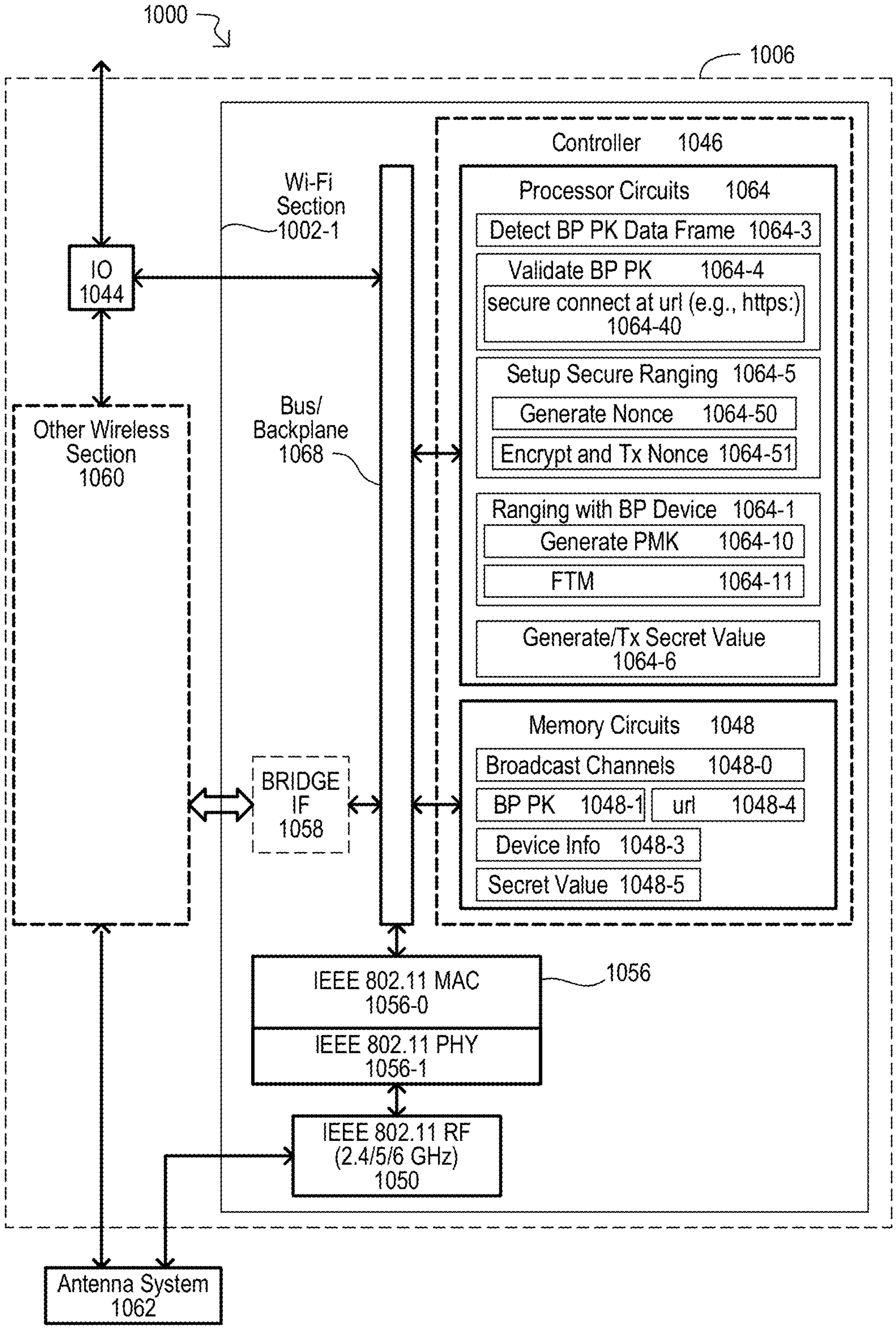
FIG. 10 is a block schematic diagram of an intermediate device according to another embodiment.

FIG. 10 shows a system 1000 according to another embodiment. A system can include items like those of FIG. 7, and such items are referred to by the same reference character but with the leading digits being an "10" instead of a "7".

A system 1000 can differ from that of FIG. 7 in that device 1002 can operate as an intermediate device in a configuration operation between two wireless devices. Device 1002 can operate according to one or more Wi-Fi standards. Processor circuits 1064 can include, but are not limited to, the following operations. A detect BP PK data frame 1064-3 operation can include monitoring one or more predetermined Wi-Fi channels for a public action frame from wireless devices that can include a BP PK and other information, as described herein. A validate BP PK operation 1064-4 can include an intermediate device following a url or other network address provided from a wireless device. In the embodiment shown, intermediate device 1006 can make a secure connection at the url, using any appropriate protocol/method (e.g., https) 1064-40.

If a BP PK is validated, processor circuits 1064 can setup a secure ranging operation 1064-5, In some embodiments such an action can include generating a nonce 1064-50 and encrypting the nonce with the validated BP PK and transmitting the encrypted value to the wireless device 1064-51.

Ranging with a BP device 1064-1 can include executing a secure ranging operation with a wireless device that indicated a user input (e.g., button push). In the embodiment shown, such an action can include generating a PMK 1064-10. Such an action can include using a nonce shared with the wireless device. Ranging can include FTM 1064-11 relying on signal transit times to establish range.

Processor circuits 1064 can also generate and transmit a secret value to wireless devices 1046-6. In some embodiments, such transmissions can be secured with the PMK used in ranging operations.

In this way, an intermediate device can detect a Wi-Fi data frame indicating a user input (e.g., button push) and public key of a wireless device. The intermediate device can enter a secure wireless ranging operation using a validated public key, and then provide a secret value shared with another wireless device.

Figure 11:
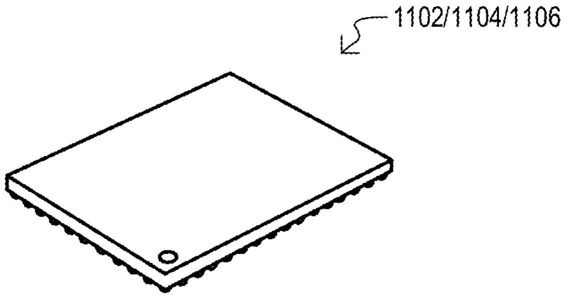
FIG. 11 is a diagram of an integrated circuit device according to an embodiment.

While embodiments can include systems and devices with various interconnected components, embodiments can also include unitary devices having Wi-Fi circuits and/or NFC circuits. In some embodiments, such unitary devices can be advantageously compact single integrated circuits (i.e., chips). FIG. 11 show one example of a packaged single chip wireless device 1102 (or 1104 or 1106) according to an embodiment. Such a device 1102 can include circuits for executing provisioning operations to add a device to a wireless network using a trusted intermediary device, as described herein and equivalents. In some embodiments, a device 1102 can include circuits like those shown in any of FIG. 6, 7, 8, 9, or 10.

However, it is understood that a device according to embodiments can include any other suitable integrated circuit packaging type, as well as direct bonding of a device chip onto a circuit board or substrate.

In this way, wireless devices and/or intermediate devices can take the form of, and/or include, single integrated circuit devices.

While embodiments can include the various methods described in conjunction with systems and devices described herein, additional methods will now be described with reference to flow diagrams.

Figure 12:
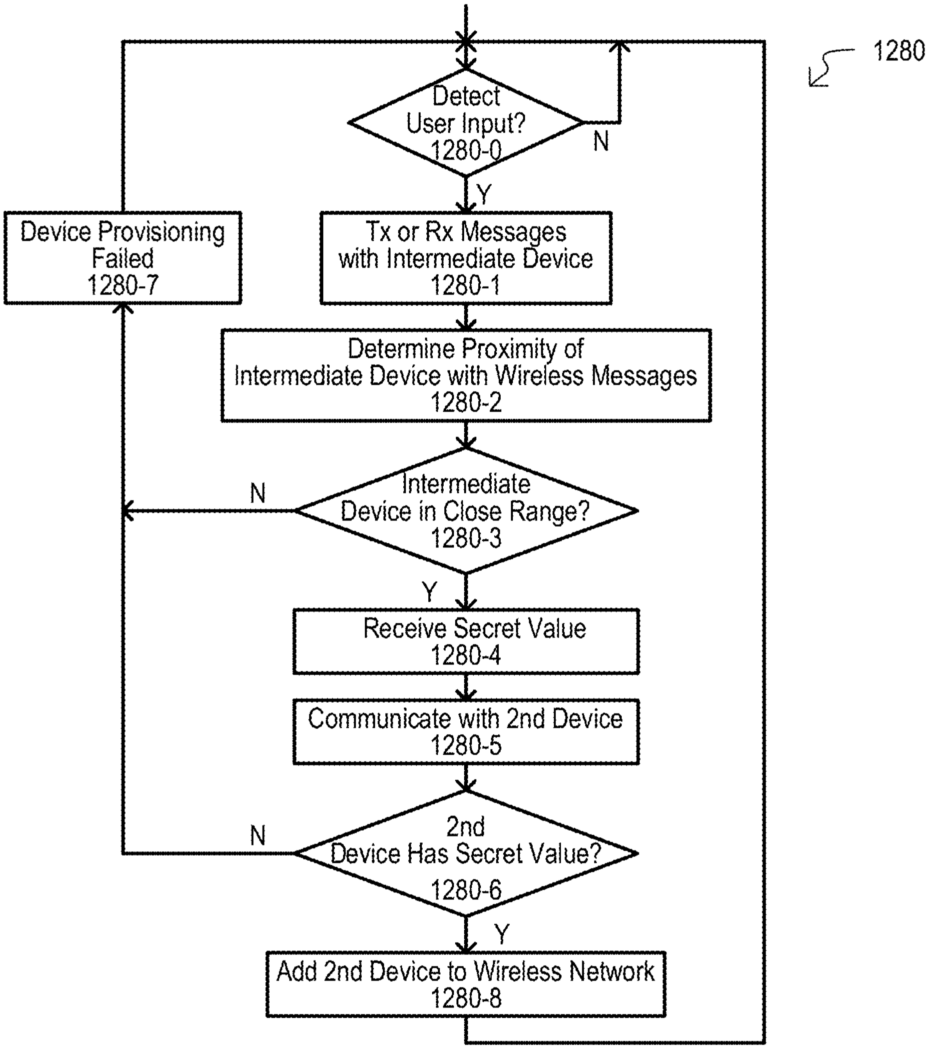
FIG. 12 is a flow diagram of a method for provisioning a wireless device according to an embodiment.

FIG. 12 is a flow diagram of a method 1280 according to an embodiment. A method 1280 can be executed by a wireless device seeking to enter into an operation (e.g., provisioning operation) to add a device to a network. A method 1280 can be executed by a device the controls entry to a network (e.g., AP), or a to-be-added device.

A method 1280 can include detecting a user input 1280-0. Such an action can include any suitable method in which a user can indicate a close presence to a wireless device, including any of those described herein, including but not limited to pressing a button, touching a personal device to the wireless device, or holding a personal device in proximity to the wireless device.

If a user input is detected (Y from 1280-0), a method can transmit or receive messages with an intermediate device 1280-1. Such an action can the form of any of those described herein and equivalents, including a wireless device initiating communications, or an intermediate device initiating communications. Further, communications can be according to one or more wireless standards. A method can determine a proximity of an intermediate device 1280-3. Such an action can include determinations made inherently, (e.g., if wireless method is NFC), and/or operations that measure distance to an intermediate device (e.g., range finding). If an intermediate device is determined to not be in close range (N from 1280-3), a method 1280 can be determined to fail 1280-7. For example, because the intermediate device is determined to not be in range, values from the intermediate device cannot be trusted.

If an intermediate device is determined to be in close range (Y from 1280-3), a secret value can be received 1280-4. However, in other embodiments a secret value can have been received previously, and then invalidated in the event an intermediate device is determined not to be in close range. A method can communicate with a second wireless device 1180-5. Such an action can include transmitting and/or receiving communications on one or predetermined channels with respect to the second device. From such communications, a determination can be made as to whether a second device the same secret value 1280-6. If a second device is determined to not have a secret value (N from 1280-6), a configuration can be determined to have failed 1280-7 (e.g., a second device does not have the secret value and so is not trustworthy).

If a second device is determined to have the secret value (Y from 1280-6), a method can proceed with adding a second device to a wireless network 1280-8.

In this way, a method can use the proximity of a trusted intermediate device to accept a secret value shared with another wireless devices. The secret code can be used to establish trust with the other wireless device and execute an automatic configuration operation with such a wireless device.

Figure 13:
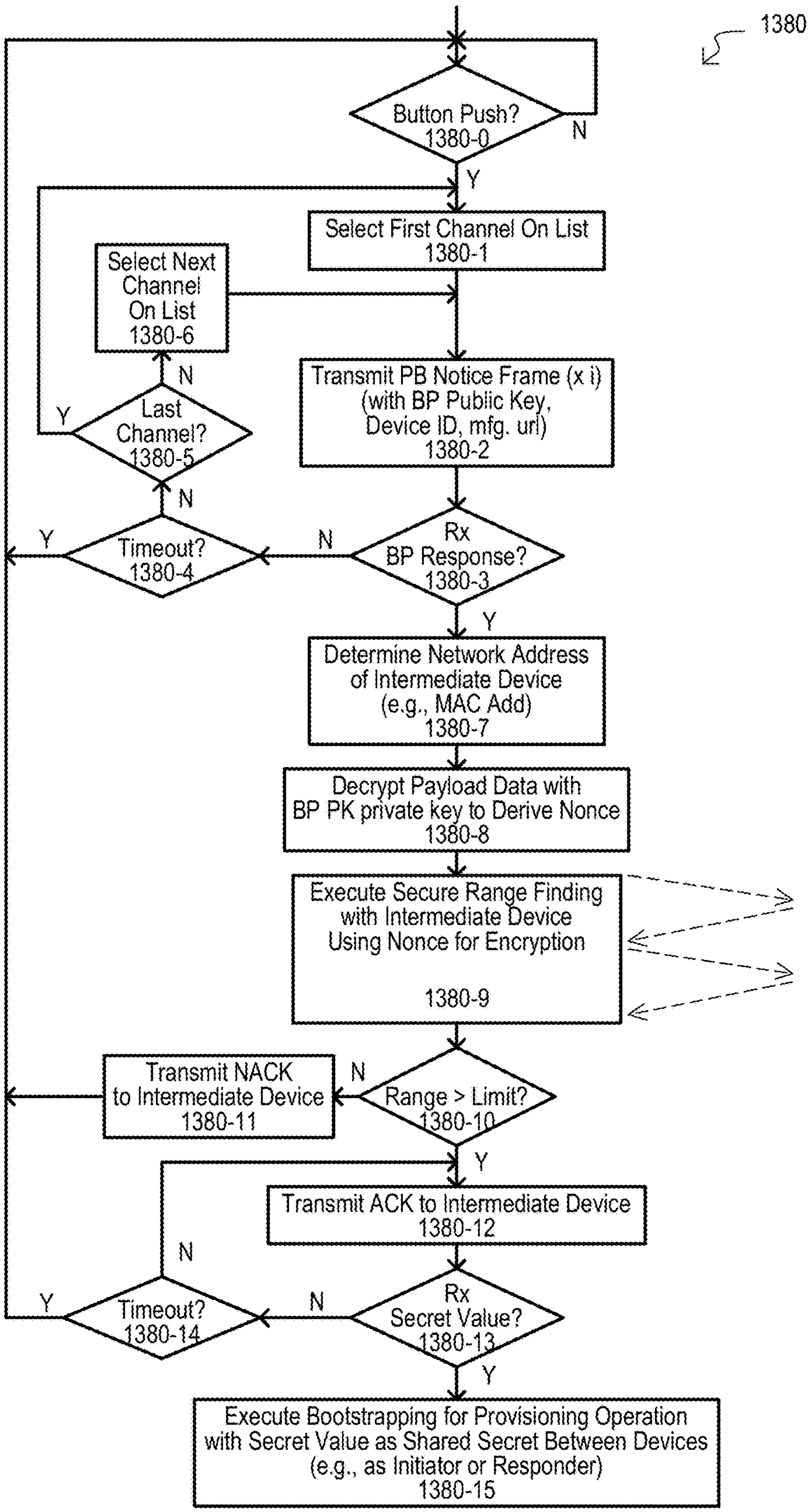
FIG. 13 is a flow diagram of a method for device provisioning using an intermediate device and wireless ranging according to an embodiment.

FIG. 13 is a flow diagram of a method 1380 according to another embodiment. A method 1380 can be executed by a Wi-Fi compatible wireless device seeking to enter into an operation to add a device to a network using a trusted intermediate device. A method 1380 can be executed be a device adding another device (e.g., AP), or a to-be-added device.

A method 1380 can include detecting a user input 1380-0. Such an action can include any of those described herein or equivalents. In response to detecting a user input (Y from 1308-0), a method can select a first channel 1380-1 on a list of channels used for broadcasting the user input message. A method can transmit a PB notice frame a number of times (x i) 1380-2. Such a BP notice frame can include a BP PK, device ID and manufacturing url, as noted herein.

If a response is not received to the BP notice (N from 1380-3), a method can wait for a timeout period 1380-4. If a timeout period is exceeded (Y from 1380-4), a method can end. If a timeout period is not exceeded (N from 1380-4), a method can determine if a last channel has been reached 1380-5. If a last channel has been reached (Y from 1380-5), a method can end. If a last channel has not been reached (N from 1380-5), a method can proceed to a next channel on a list. In some embodiments, a channel list can be predetermined list depending upon a standard, a manufacturer and/or according to a band(s) used (e.g., 2.4, 5 and/or 6 GHz).

If a response is received to the BP notice (Y from 1380-3), a method can determine a network address of an intermediate device 1380-7. In some embodiments, such an address can include a MAC address. A method can decrypt all or a portion of a payload received with a private key corresponding to the BP PK to derive a nonce 1380-8. A nonce can have been generated by an intermediate device. A method can execute a range finding operation with an intermediate device using its network address and the received nonce for encryption 1380-9. Such range finding can include any suitable wireless range finding methods, including but not limited to those that use FTM.

A method 1380 can determine if a range to an intermediate device is within a limit 1380-10 (e.g., the intermediate device is not too far away). If the intermediate device is not within range (N from 1380-10), a negative acknowledgement can be transmitted 1380-11, and a method can end.

If the intermediate device is determined to be in range (Y from 1380-10), a positive acknowledgement can be transmitted 1380-12. A method can determine if a secret value is received from an intermediate device 1380-13. If such a secret value is not received, in the embodiment shown, positive ACKs can be transmitted until a timeout period is exceeded (Y from 1380-14), and then a method can end.

If a secret value is received (Y from 1380-13), a method can execute a bootstrapping method for a provisioning operation using the secret value shared between two devices. Such actions can include operating as an initiator and/or a responder in the provisioning operation. It is understood that in such operations, initial communications may include a broadcast address, but subsequent communications can include the addresses of the two wireless devices executing the provisioning operation.

In this way, a method can use range finding to determine the trustworthiness of a secret code received from an intermediate device. The secret code can be used to establish trust with one another device that shares the same code and then execute an automatic configuration operation with such a device.

Figure 14:
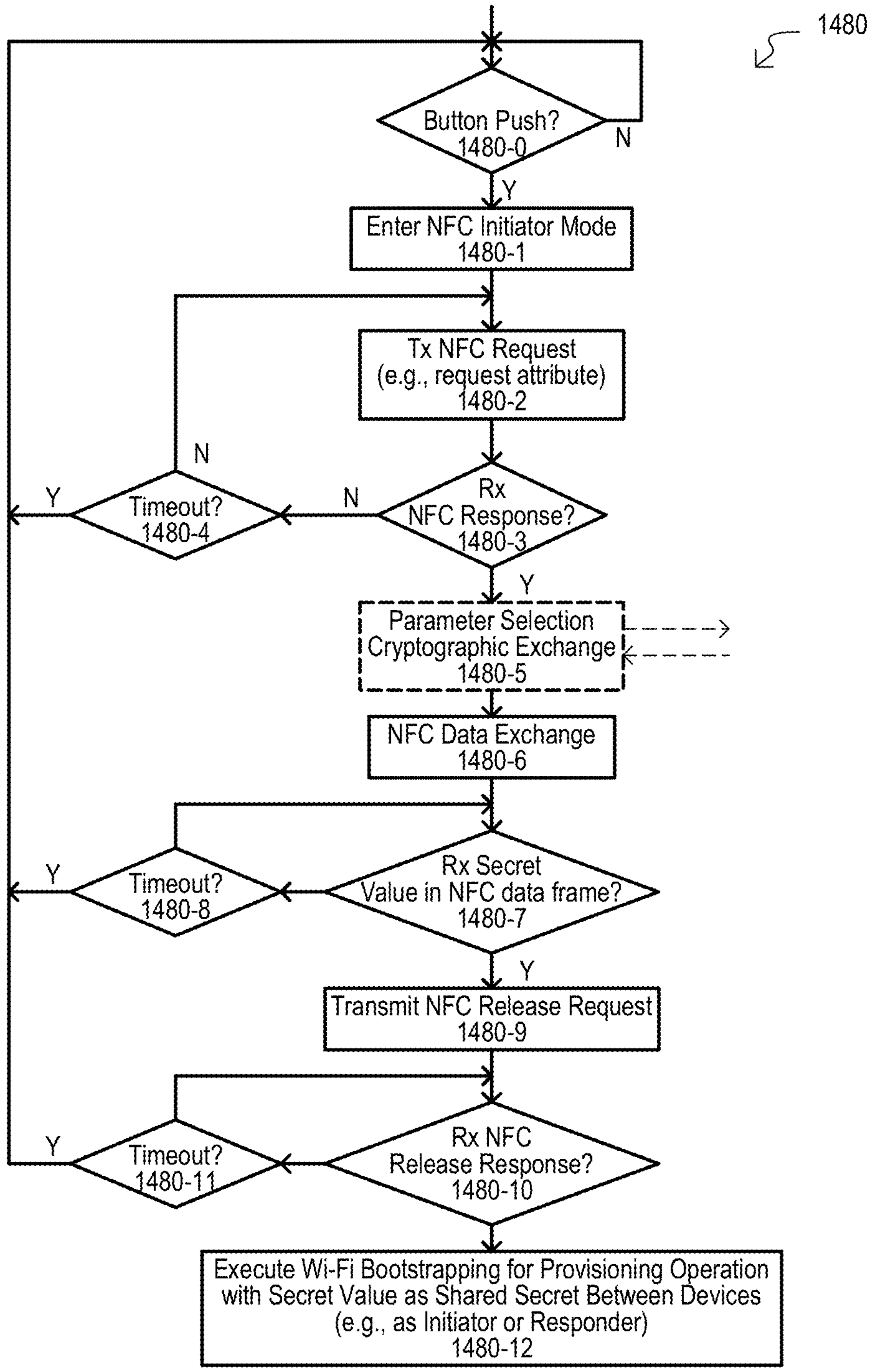
FIG. 14 is a flow diagram of a method for device provisioning using an intermediate device and NFC communications according to an embodiment.

FIG. 14 is a flow diagram of a method 1480 according to a further embodiment. A method 1480 can be executed by a wireless device having both Wi-Fi and NFC circuits seeking to enter into a provisioning operation with another device, using a trusted intermediate device. A method 1480 can be executed be a device adding another device (e.g., AP), or a to-be-added device.

A method 1480 can include detecting a user input 1480-0. Such an action can include any of those described herein. In response to an input being detected (Y from 1480-0), a method 1480 can include entering an NFC initiator mode 1480-1. An NFC request can be transmitted 1480-2. In some embodiments, such an action can include transmitting a request attribute data frame. A method can determine if a response is received 1408-3. If a response is not received within a timeout period (N from 1480-3, N from 1480-4) a method can end.

Optionally, if a response is received (Y from 1480-3), there can be parameter selection steps and a cryptographic exchange 1480-5 to enable encrypted NFC transmissions. However, alternate embodiments may include unencrypted NFC communications.

If a response is received (Y from 1480-3), an NFC data exchange can occur 1480-6. In response to a data exchange, a method can determine if a secret value was received in an NFC data frame 1480-7. If a secret value is not received within a timeout period (N from 1480-7, N from 1480-8) a method can end. If a secret value is received (Y from 1480-7) a method can transmit an NFC release request 1480-9. Such an action can include sending a transmission indicating to an intermediate device that a current NFC transaction can be concluded. If a response (e.g., release response) is not received within a timeout period (N from 1480-10, N from 1480-11) a method can end. If a response is received (Y from 1480-10) a method can execute a bootstrapping method for a provisioning operation using the secret value shared between two devices. Such actions can include operating as an initiator and/or a responder in the provisioning operation.

In this way, a method can use a close range wireless standard (e.g., NFC) to determine the trustworthiness of a secret code received from an intermediate device. The secret code can be used to establish trust with one another device that shares the same code and then execute an automatic configuration operation with such a device.

Figure 15:
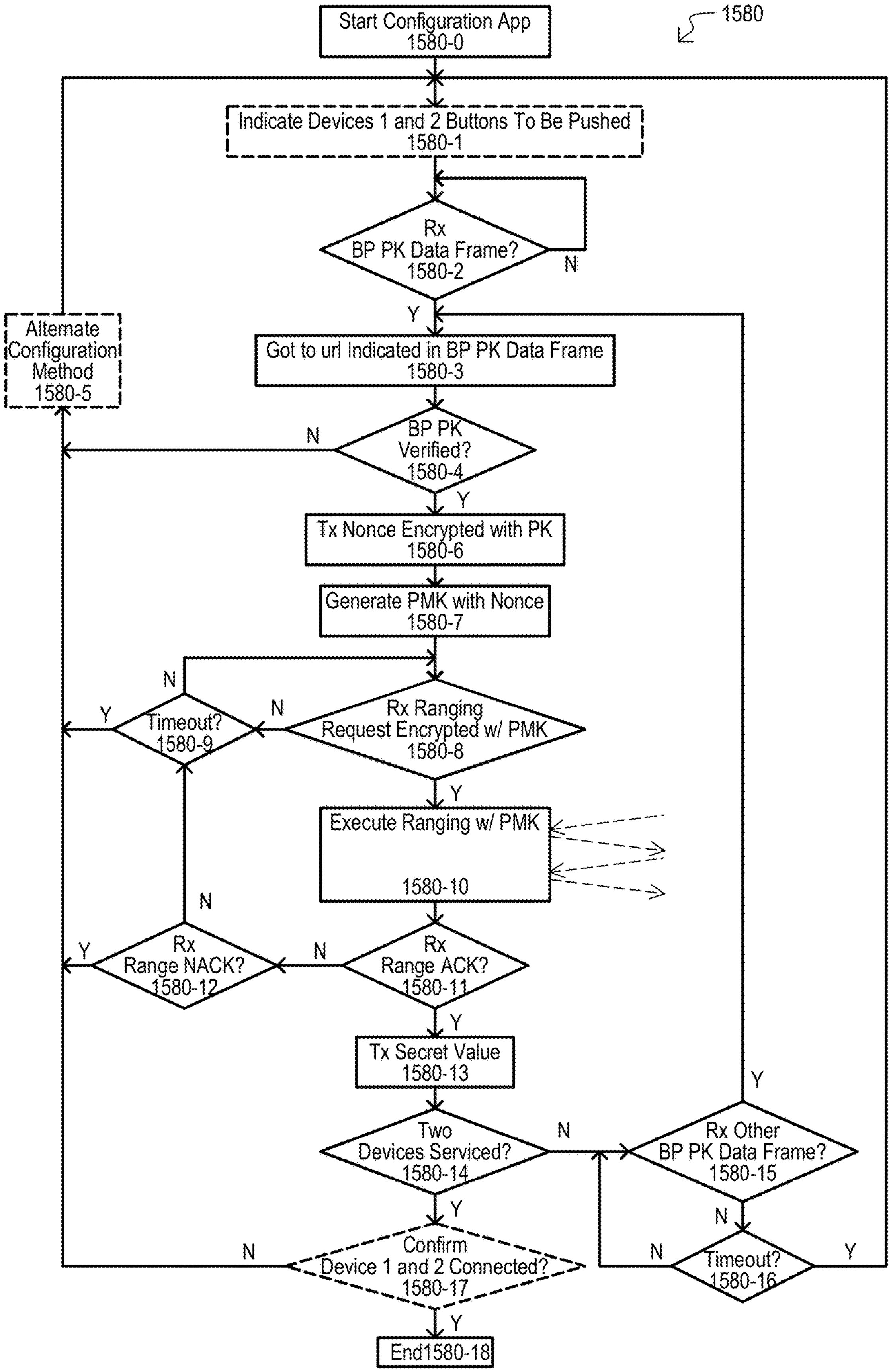
FIG. 15 is a flow diagram of a method for enabling secure device provisioning using an intermediate device and wireless ranging according to an embodiment.

FIG. 15 is a flow diagram of a method 1580 according to an embodiment. A method 1580 can be executed by a Wi-Fi compatible intermediate device to provide a shared secret value to two wireless devices so that such wireless devices can trust one another in a configuration operation.

A method 1580 can include starting a configuration application 1580-0. Such an action can include a user activating an application, or an application automatically starting upon power up of a device. Optionally, a method 1580 can include indicating that buttons (or other user inputs) should be activated on the devices 1580-1. Such an action can include sending a message to a user, including but not limited to, through an intermediate device.

A method 1580 determine the presence of a BP PK data frame 1580-2. Such an action can include monitoring predetermined channels for predetermined amounts of time for a BP PK data frame. If a BP PK data frame is received (Y from 1580-2), a method can go to a url indicated in a BP PK data frame 1580-3 to verify the BP PK. If a BP PK is not verified (N from 1580-4), a method can end or optionally, an alternate configuration method can be used 1580-5.

If a BP PK is verified (Y from 1580-4), a method can transmit a nonce encrypted with the BP PK 1580-6. A PMK can be generated with the generated nonce 1580-7. Such a PMK can be used in subsequent ranging operations. In the embodiment shown, a method can receive a ranging request encrypted with the PMK 1580-8. However, in an alternate embodiment, a method can transmit a request to start a ranging request that is encrypted with a PMK. If no ranging request is received with a timeout period (Y from 1580-9) a method can end or optionally, an alternate configuration method can be used 1580-5.

If a ranging request is received (Y from 1580-8) (or a response to a transmitted ranging request is received), a method can execute a wireless ranging operation 1580-10 with a wireless device. In some embodiments, such a ranging operation can be a secure ranging operation. In some embodiments, such a secure ranging operation can use FTM techniques.

Following a ranging operation, a method 1580 can determine if an acknowledgement is received from a wireless device. If a positive ACK is not received (N from 1580-11), a method can determine if a NACK is received 1580-12. If no ACK or NACK is received within a predetermined time period (N from 1580-12, Y from 1580-9) or a NACK is received (Y from 1580-12), a method can end or optionally, an alternate configuration method can be used 1580-5.

If an ACK is received (Y from 1580-11), a secret value can be transmitted 1580-13. In some embodiments, such a transmission can be encrypted with the PMK.

A method 1580 can include determining if two devices have been serviced 1580-14. Such an action can include determining if a secret value has been transmitted to two different wireless devices from which positive ACKs have been received. If two devices have not been serviced (N from 1580-14), a method can determine if a BP PK data frame has been received from another device 1580-15. If such another BP PK data frame has been received within a timeout period (N from 1580-15, Y from 1580-16), a method can end.

If a method 1580 determines that two devices have been serviced (Y from 1580-14), optionally, a method can attempt to confirm that the two devices are connected to the network 1580-17. If the devices cannot be confirmed as connected to the network (N from 1580-7), a method can end or optionally, an alternate configuration method can be used 1580-5. If the devices are confirmed as connected to the network (Y from 1580-7), a method can end.

In this way, a method can use a wireless ranging to establish trustworthiness with other wireless devices, and transmit a secret value to such devices. The secret value can be used to establish trust with one another device that shares the same code and then execute an automatic configuration operation with such a device.

Figure 16:
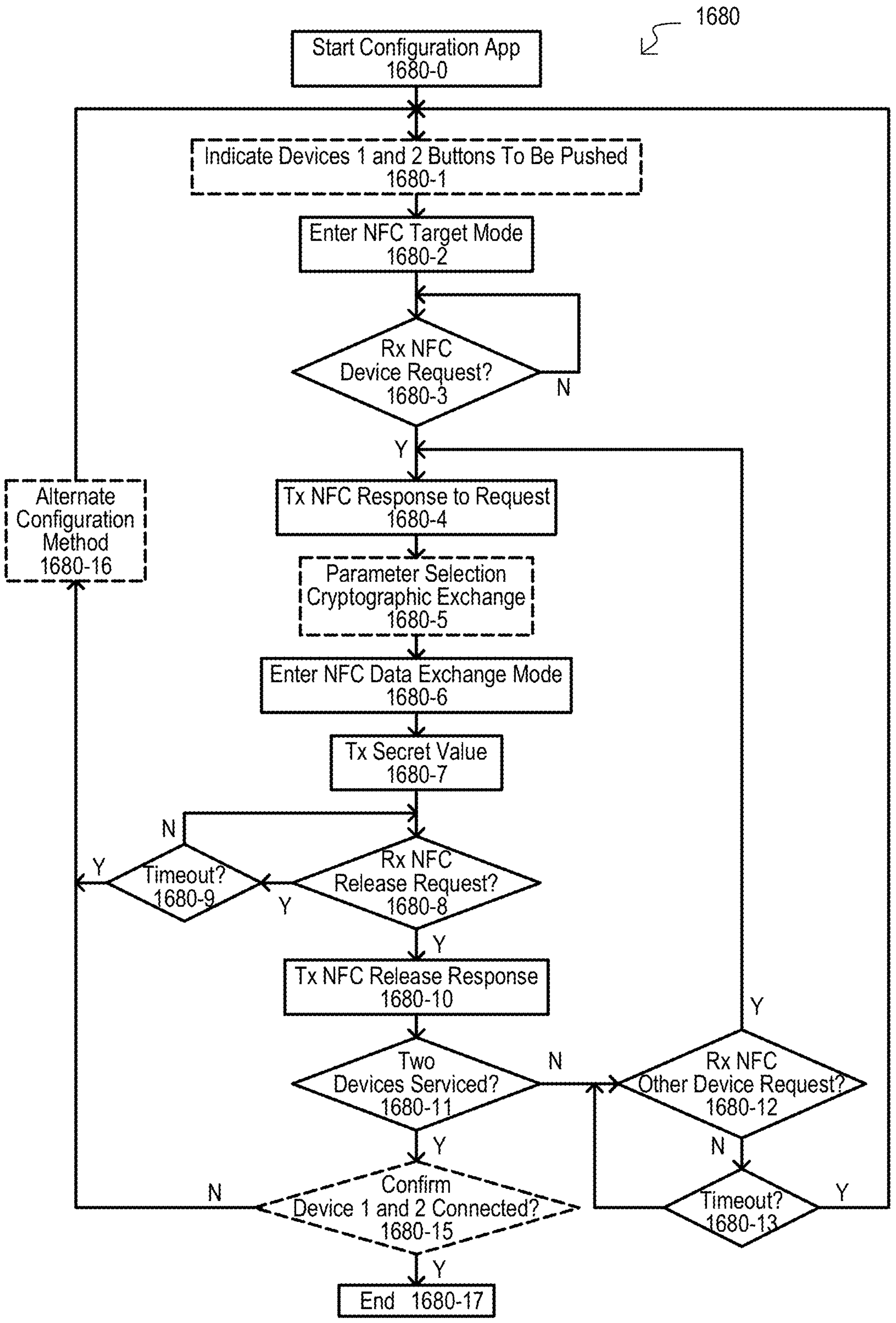
FIG. 16 is a flow diagram of a method for enabling secure device provisioning using an intermediate device and NFC communications according to an embodiment.

FIG. 16 is a flow diagram of a method 1680 according to an embodiment. A method 1680 can be executed by an intermediate device that can establish its trustworthiness with NFC communications. The intermediate device can provide a shared secret value to two wireless devices so that such wireless devices can trust one another in a configuration operation.

A method 1680 can include starting a configuration application 1680-0. Optionally, a method 1680 can include indicating that buttons (or other user inputs) should be activated on the devices 1680-1. A method 1680 can enter an NFC target mode 1680-2. However, in other embodiments, such a method can include entering into an NFC initiator mode. That, with regard to the NFC protocol used, in some embodiments a wireless device can be an initiator while an intermediate device is a target, while in other embodiments, a wireless device can be a target while an intermediate device is an initiator.

In the embodiment shown, a method 1680 can determine if an NFC request was received. If such a request has been received (Y from 1680-3), an NFC response can be transmitted 1680-4. Again, in other embodiments such roles could be reversed with an intermediate device transmitting a request and proceeding once a response is received. Optionally, a method 1680 can include establishing a secure NFC connection by selecting parameters and executing a cryptographic exchange 1680-5. However, embodiments can include unencrypted NFC communications that rely on close proximity for trustworthiness.

In the embodiment shown, an intermediate device can enter into a data exchange operation with a wireless device 1680-6. In such an exchange a secret value can be transmitted 1680-7. In some embodiments, a method 1680 can wait for a response from a wireless device. In the embodiment shown, this can include receiving an NFC release request 1680-8. If such a response is not received within a timeout period, a method 1680 can switch to an alternate configuration method 1680-16 and/or end. In the embodiment shown, in response to a release request, a method can transmit a release response 1680-10, which can indicate NFC operations are concluded for the transaction.

A method 1680 can proceed in manner like that of FIG. 15, determining if two devices have been serviced 1680-11, and waiting for an NFC request (1680-12, 1680-13) from another device if only one device has been serviced. Optionally, a method 1680 can confirm that the two serviced devices are connected 1680-15.

In this way, a method can use NFC communications to establish trustworthiness with other wireless devices, and transmit a secret value to such devices. The secret value can be used to establish trust with one another device that shares the same code and then execute an automatic configuration operation with such a device.

Figure 17:
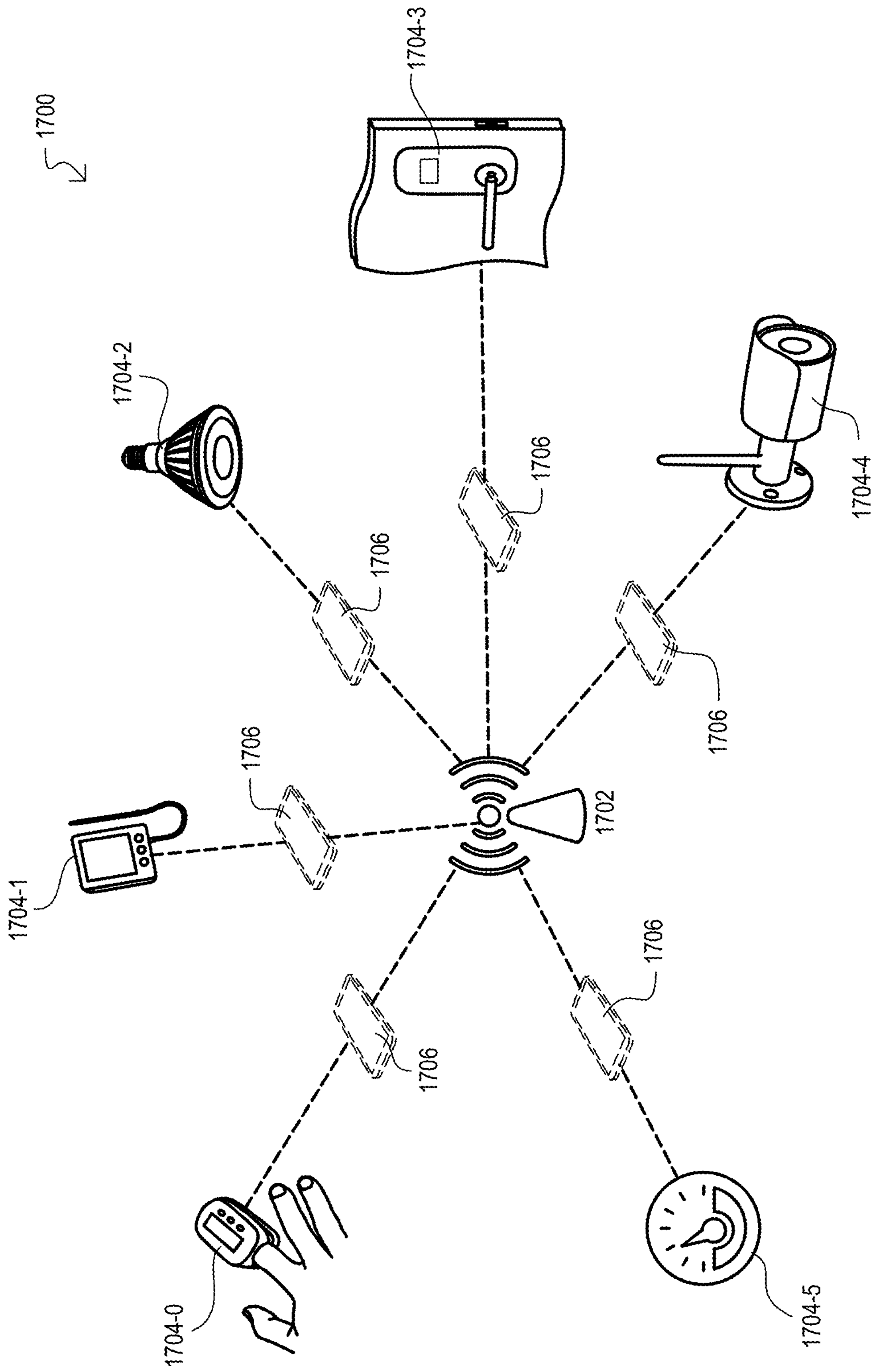
FIG. 17 is a diagram showing systems with Internet-of-Things (IoT) devices according to embodiments.

FIG. 17 shows systems 1700 according to various other embodiments. Systems 1700 can include a controlling wireless device 1702 and a number of other wireless devices 1704-0 to 1704-5. A controlling wireless device 1702 can enable a device to be added to a wireless network (e.g., an AP with configuration abilities). An intermediate device 1706 can communicate with controlling wireless device 1702 and each wireless device to be added (1704-0 to -5) to execute automatic configuration methods as described herein.

In the embodiment shown, wireless devices (1704-0 to -5) can be "Internet-of-things" (IoT) type devices, including but not limited to: medical devices 1704-0/1, lighting devices 1704-2, security devices 1704-3/4, or instrumentation devices 1704-5. However, such wireless devices are provided by way of example, and any suitable wireless device can benefit from the secure, automatic configuration methods described herein and equivalents.

In operation, a user input can be activated on a controlling wireless device 1702, and a wireless device to be added to a network (e.g., 1704-0). Intermediate device 1706 can establish trust with both devices according to the methods described herein and equivalents, and then provide a same secret value to both wireless devices (e.g., 1702 and 1704-0). The wireless devices (e.g., 1702 and 1704-0) can use the shared secret to establish trust, and enter into a configuration operation.

In this way, IoT type devices can be automatically configured with a trusted intermediate device that provides a shared secret value.

Figure 18A:
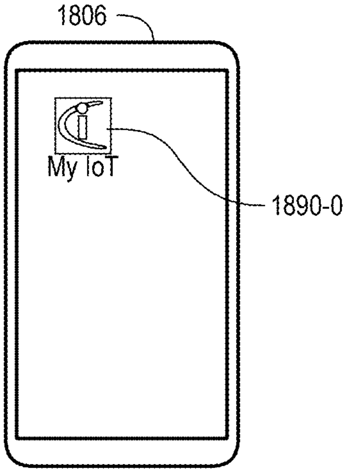
FIGS. 18A to 18G are diagrams showing an application for adding a device to a network executable by an intermediate device according to an embodiment.
Figure 18B:
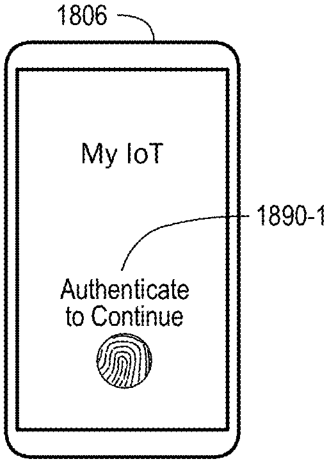

FIGS. 18A to 18G are diagrams showing operations of an intermediate device 1806 according to embodiments. FIG. 18A shows how an intermediate device can be a smart phone or tablet type device having a configuration application 1890-0 installed thereon. FIG. 18B shows how activation of a configuration application can result in a user authentication operation 1890-1. While FIG. 18B shows a user authentication operation 1890-1 that includes biometric security, alternate embodiments can include any other authentication types, including two-factor authentication.

Figure 18C:
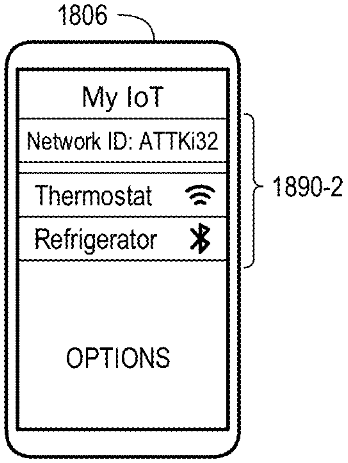
Figure 18D:
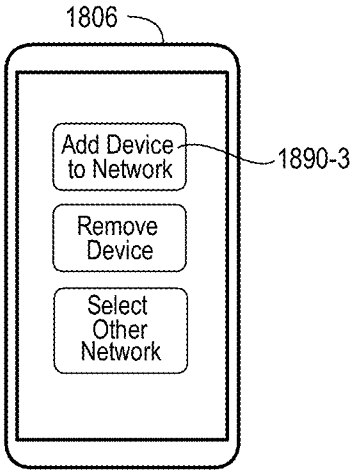
Figure 18E:
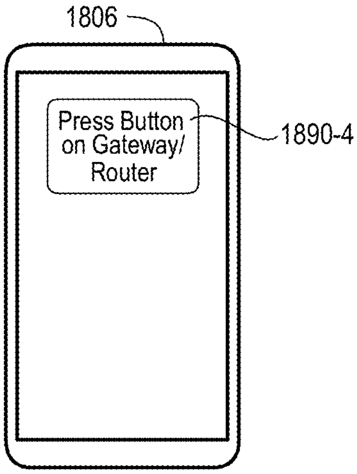
Figure 18F:
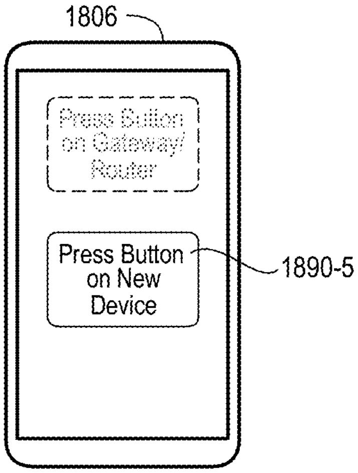

FIG. 18C shows how an application can provide network information 1890-2 for a network to which a wireless device can be added. In the embodiment shown, network information can identify the network, as well as devices currently connected to the network. FIG. 18D shows how adding a device to a network 1890-3 can be a selection in an application. FIG. 18E shows how an application can direct a user to activate (e.g., press a button on) one of the wireless devices 1890-4 (in this case the network addition controlling device). In some embodiments, an intermediate device can provide a response that the button push has been detected. Similarly, FIG. 18F shows how an application can direct a user to activate (e.g., a press button) the wireless device to be added 1890-5. In some embodiments, an intermediate device can provide a response that the button push on the second device has been detected. Once the two wireless devices have been activated, intermediate device can enter into a wireless operation to establish its trustworthiness through close proximity, and then provide a shared secret value to the wireless devices as described herein and equivalents. The two devices can then enter into a provisioning operation as described herein and equivalents.

Figure 18G:
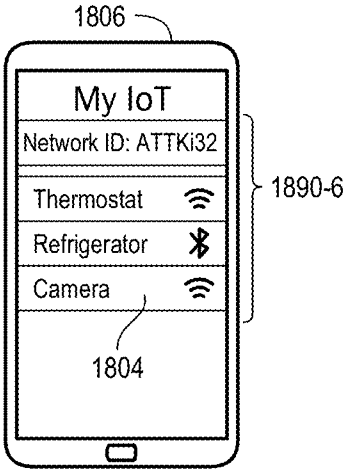

FIG. 18G shows how, following a successful configuration operation, a newly added target device 1804 can be included in network information 1890-6.

In this way, an intermediate can include an application that can communicate with wireless devices to establish trust through close proximity, and provide a shared secret value to both devices to enable/start a provisioning operation between the two wireless devices.

Embodiments can include methods, devices and systems that include, by operation of a first wireless device, in response to detecting a user input at the first wireless device, transmitting a first wireless message. In response to receiving a second wireless message, a determination can be made that an intermediate device is within a predetermined proximity. A sharing message can be received that includes a secret value. In response to receiving at least an exchange message, a determination can be made that a second wireless device stores the secret value. An operation can be executed to add the first or second wireless device to a wireless network that includes transmission of provisioning messages having the address corresponding to the second wireless device.

Embodiments can include methods, devices and systems can include an interface configured receive an indication in response to a user input. Wireless circuits compatible with at least one wireless standard can be configured to at least receive wireless messages. Controller circuits can be configured to control the wireless circuits to transmit a first wireless message in response to the indication, determine that an intermediate device is within a predetermined proximity from received wireless messages, determine a secret value from the received wireless messages, determine that a second wireless device stores the secret value from wireless messages having an address corresponding to the second wireless device, and execute an operation to add the first or second wireless device to the wireless network that includes transmission of provisioning messages having an address corresponding to the second wireless device.

Embodiments can include methods, devices and systems can include a first wireless device configured to transmit a first wireless message in response to a user input at the first wireless device, determine that an intermediate device is within a predetermined proximity from received wireless messages, determine a secret value from at least received wireless messages, determine that a second wireless device stores the secret value from at least received wireless messages, and execute an operation to add the first or second wireless device to a wireless network that comprises a transmission of provisioning messages having an address corresponding to the second wireless device. An antenna system can be configured to transmit the first wireless message and receive the second wireless message.

Methods devices and systems according to embodiments can include detecting a user input at the first wireless device can include detecting the activation of a physical input of a first wireless device.

Methods devices and systems according to embodiments can include first and second messages are compatible with at least one NFC standard. Determining that the intermediate device is within the predetermined proximity can include receiving a wireless message according to the NFC standard.

Methods devices and systems according to embodiments can include, by operation of the intermediate device wirelessly transmitting a secret value to the first wireless device according to at least one NFC standard. The secret value can also be wirelessly transmitted to a second wireless device according to the at least one NFC standard.

Methods devices and systems according to embodiments can include a second wireless message being part of a wireless ranging operation.

Methods devices and systems according to embodiments can include a first wireless message that is compatible with at least one Wi-Fi standard. The first wireless message including can include a public key and a network location. By operation of a first wireless device, a master key can be determined by decrypting at least a portion of the second wireless message with a private key corresponding to the public key. A secure wireless ranging operation can be executed according to at least one Wi-Fi standard using the master key.

Methods devices and systems according to embodiments can include a network location including a url. By operation of an intermediate device, a public key received from the first wireless device can be verified by at least visiting the url. A predetermined value can be encrypted with the public key and transmitted to a first wireless device.

Methods devices and systems according to embodiments can include determining that a second device stores the same secret value by executing a proof of knowledge of shared code, key phrase or word (PKEX) operation with the secret value as the shared code, key phrase or word. Executing an operation to add the first or second wireless device to the wireless network can include executing a device provisioning protocol.

Methods devices and systems according to embodiments can include, by operation of the second wireless device, in response to detecting a user input at the second wireless device, transmitting a third wireless message. In response to receiving a fourth wireless message, determining that the intermediate device is within the predetermined proximity. A second sharing message can be received that includes a secret value. In response to receiving at least a second exchange message, determining that a first wireless device stores the secret value. Executing an operation to add the first or second wireless device to the wireless network by transmission of second provisioning messages having the address corresponding to the first wireless device.

Methods devices and systems according to embodiments can include controller circuits configured to execute wireless ranging to determine that an intermediate device is within the predetermined proximity.

Methods devices and systems according to embodiments can include the controller circuits are configured to generate a first wireless message. The first wireless message being compatible with at least one Wi-Fi standard, and can include at least a public key. Controller circuits can also determine a master key by decrypting at least a portion of a received response message with a private key corresponding to the public key, and execute a secure wireless ranging operation according to at least one Wi-Fi standard using the master key.

Methods devices and systems according to embodiments can include wireless circuits having first wireless circuits compatible with a first wireless standard having a first effective range, and second wireless circuits compatible with a second wireless standard having a second effective range substantially shorter than the first effective range. Controller circuits can be configured to determine that an intermediate device is within the predetermined proximity with messages that are compatible with the second wireless standard, and determine a secret value from messages that are compatible with the second wireless standard.

Methods devices and systems according to embodiments can include the first wireless circuits compatible with at least one Wi-Fi standard and the second wireless circuits are compatible with an NFC standard.

Methods devices and systems according to embodiments can include an intermediate device configured to transmit a first sharing message to the first wireless device that includes the secret value, and transmit a second sharing message to the second wireless device that includes the secret value.

Methods devices and systems according to embodiments can include an intermediate device configured to receive a public key and network location from the first wireless device, validate the public key using at least the network location, encrypt a predetermined value with the public key, and transmit the encrypted predetermined value to the first wireless device.

Methods devices and systems according to embodiments can include a first wireless device configured to execute a wireless ranging operation to determine that an intermediate device within a predetermined proximity.

Methods devices and systems according to embodiments can include a first wireless device configured to transmit the detect message according to a first standard, determine that the intermediate device is within the predetermined proximity from wireless messages according to a second standard, determine the secret value from wireless messages according to the second standard, determine that the second wireless device stores the secret value from wireless messages according to the first standard, and the provisioning messages are transmitted according to the first standard. The first wireless standard can have a first effective range and the second wireless standard can have a second effective range substantially shorter than the first effective range.

Methods devices and systems according to embodiments can include a second wireless device is configured to transmit a second wireless message in response to a user input at the second wireless device, determine that an intermediate device is within a predetermined proximity from at least one wireless message received from the intermediate device, determine a secret value from at least one wireless message received from the intermediate device, determine that a first wireless device stores the secret value from at least one wireless message received from the first wireless device, and execute the operation to add the first or second wireless device to the wireless network that includes transmission of second provisioning messages having an address corresponding to the first wireless device.

It should be appreciated that reference throughout this specification to "one embodiment" or "an embodiment" means that a particular feature, structure or characteristic described in connection with the embodiment is included in at least one embodiment of the present invention. Therefore, it is emphasized and should be appreciated that two or more references to "an embodiment" or "one embodiment" or "an alternative embodiment" in various portions of this specification are not necessarily all referring to the same embodiment. Furthermore, the particular features, structures or characteristics may be combined as suitable in one or more embodiments of the invention.

Similarly, it should be appreciated that in the foregoing description of exemplary embodiments of the invention, various features of the invention are sometimes grouped together in a single embodiment, figure, or description thereof for the purpose of streamlining the disclosure aiding in the understanding of one or more of the various inventive aspects. This method of disclosure, however, is not to be interpreted as reflecting an intention that the claims require more features than are expressly recited in each claim. Rather, inventive aspects lie in less than all features of a single foregoing disclosed embodiment. Thus, the claims following the detailed description are hereby expressly incorporated into this detailed description, with each claim standing on its own as a separate embodiment of this invention.

While this invention has been described with reference to illustrative embodiments, this description is not intended to be construed in a limiting sense. Various modifications and combinations of the illustrative embodiments, as well as other embodiments of the invention, will be apparent to persons skilled in the art upon reference to the description. It is therefore intended that the appended claims encompass any such modifications or embodiments.

What is claimed is:

1. A method, comprising:

by operation of a first wireless device,
 in response to detecting a user input at the first wireless device, transmitting a first wireless message,
 in response to receiving a second wireless message, determining that an intermediate device is within a predetermined proximity,
 receiving at least a sharing message that includes a secret value,
 in response to receiving at least an exchange message, determining that a second wireless device stores the secret value, and
 executing an operation to add the first or second wireless device to a wireless network comprising transmission of provisioning messages having an address corresponding to the second wireless device.

2. The method of claim 1, wherein detecting the user input at the first wireless device includes detecting an activation of a physical input of the first wireless device.

3. The method of claim 1, wherein:

the first and second messages are compatible with at least one near field communication (NFC) standard; and
determining that the intermediate device is within the predetermined proximity includes receiving the second wireless message.

4. The method of claim 3, further including:

by operation of the intermediate device
 wirelessly transmitting the secret value to the first wireless device according to the at least one NFC standard, and
 wirelessly transmitting the secret value to the second wireless device according to the at least one NFC standard.

5. The method of claim 1, wherein the second wireless message is part of a wireless ranging operation.

6. The method of claim 1, further including:

the first wireless message is compatible with at least one Institute of Electrical and Electronics Engineers (IEEE) 802.11 wireless (WLAN) standard, the first wireless message including at least
 a public key, and
 a network location;
by operation of the first wireless device,
 determining a master key by decrypting at least a portion of the second wireless message with a private key corresponding to the public key, and
 executing a secure wireless ranging operation according to at least one WLAN standard using the master key.

7. The method of claim 6, further including:

the network location comprises a universal resource locator (url); by operation of the intermediate device
 verifying the public key received from the first wireless device by at least visiting the url, and
 encrypting a predetermined value with the public key and transmitting the encrypted predetermined value to the first wireless device.

8. The method of claim 1, wherein:

determining that the second device stores the same secret value includes executing a proof of knowledge of shared code, key phrase or word (PKEX) operation with the secret value as the shared code, key phrase or word; and
executing the operation to add the first or second wireless device to the wireless network includes executing a device provisioning protocol.

9. The method of claim 1, further including:

by operation of the second wireless device,
 in response to detecting a user input at the second wireless device, transmitting a third wireless message,
 in response to receiving a fourth wireless message, determining that the intermediate device is within the predetermined proximity,
 receiving at least a second sharing message that includes the secret value,
 in response to receiving at least a second exchange message, determining that the first wireless device stores the secret value, and
 executing the operation to add the first or second wireless device to the wireless network comprises transmission of second provisioning messages having the address corresponding to the first wireless device.

10. A device, comprising:

an interface configured receive an indication in response to a user input;
wireless circuits compatible with at least one wireless standard, and configured to transmit and receive wireless messages;
controller circuits configured to
 control the wireless circuits to transmit a first wireless message in response to the indication,
 determine that an intermediate device is within a predetermined proximity from received wireless messages,
 determine a secret value from the received wireless messages,
 determine that a second wireless device stores the secret value from wireless messages having an address corresponding to the second wireless device, and
 execute an operation to add the first or second wireless device to the wireless network that includes transmission of provisioning messages having an address corresponding to the second wireless device.

11. The device of claim 10, wherein the controller circuits are configured to execute wireless ranging to determine that the intermediate device is within the predetermined proximity.

12. The device of claim 11, wherein:

the controller circuits are configured to
 generate the first wireless message, the first wireless message being compatible with at least one IEEE 802.11 wireless (WLAN) standard, the first wireless message including at least a public key; and determine a master key by decrypting at least a portion of a received response message with a private key corresponding to the public key, and execute a secure wireless ranging operation according to at least one WLAN standard using the master key.

13. The device of claim 10, wherein:

the wireless circuits include first wireless circuits compatible with a first wireless standard having a first effective range, and second wireless circuits compatible with a second wireless standard having a second effective range substantially shorter than the first effective range; and the controller circuits are configured to determine the intermediate device is within the predetermined proximity with messages that are compatible with the second wireless standard, and determine the secret value from messages that are compatible with the second wireless standard.

14. The device of claim 13, wherein:

the first wireless circuits are compatible with an IEEE 802.11 wireless standard; and the second wireless circuits are compatible with a near field communication (NFC) standard.

15. A system, comprising:

a first wireless device configured to transmit a first wireless message in response to a user input at the first wireless device, determine that an intermediate device is within a predetermined proximity from received wireless messages, determine a secret value from at least received wireless messages, determine that a second wireless device stores the secret value from at least received wireless messages, and execute an operation to add the first or second wireless device to a wireless network that comprises a transmission of provisioning messages having an address corresponding to the second wireless device; and an antenna system configured to transmit the first wireless message and receive the second wireless message.

16. The system of claim 15, further including:

an intermediate device configured to transmit a first sharing message to the first wireless device that includes the secret value, and transmit a second sharing message to the second wireless device that includes the secret value.

17. The system of claim 15, further including:

the intermediate device configured to receive a public key and network location from the first wireless device, validate the public key using at least the network location, encrypt a predetermined value with the public key, and transmit the encrypted predetermined value to the first wireless device.

18. The system of claim 15, wherein the first wireless device is configured to execute a wireless ranging operation to determine that the intermediate device within the predetermined proximity.

19. The system of claim 15, wherein:

the first wireless device is configured to transmit the detect message according to a first standard, determine that the intermediate device is within the predetermined proximity from wireless messages according to a second standard, determine the secret value from wireless messages according to the second standard, determine that the second wireless device stores the secret value from wireless messages according to the first standard, and the provisioning messages are transmitted according to the first standard; wherein the first wireless standard has a first effective range, and the second wireless standard has a second effective range substantially shorter than the first effective range.

20. The system of claim 15, further including:

the second wireless device is configured to transmit a second wireless message in response to a user input at the second wireless device, determine that the intermediate device is within a predetermined proximity from at least one wireless message received from the intermediate device, determine a secret value from at least one wireless message received from the intermediate device, determine that the first wireless device stores the secret value from at least one wireless message received from the first wireless device, and execute the operation to add the first or second wireless device to the wireless network that includes transmission of second provisioning messages having an address corresponding to the first wireless device.

* * * * *